(12) United States Patent
DeLuca et al.

(10) Patent No.: US 9,249,264 B2
(45) Date of Patent: Feb. 2, 2016

(54) HYBRID VEHICLE SYSTEMS

(75) Inventors: James Joseph DeLuca, Parma, OH (US); Gary D Tucker, Naples, FL (US)

(73) Assignee: Envont LLC, Naples, FL (US)

( * ) Notice: Subject to any disclaimer, the term of this patent is extended or adjusted under 35 U.S.C. 154(b) by 508 days.

(21) Appl. No.: 13/402,048

(22) Filed: Feb. 22, 2012

(65) Prior Publication Data

US 2012/0145037 A1 Jun. 14, 2012

Related U.S. Application Data

(63) Continuation of application No. 12/340,207, filed on Dec. 19, 2008, now abandoned, which is a continuation-in-part of application No. 12/202,076, filed on Aug. 29, 2008, now abandoned, which is a (Continued)

(51) Int. Cl.
C08G 77/58 (2006.01)
B01J 13/00 (2006.01)
(Continued)

(52) U.S. Cl.
CPC .............. C08G 77/58 (2013.01); B01J 13/0039 (2013.01); B01J 13/0047 (2013.01); B01J 13/00 (2013.01); C01G 23/053 (2013.01); C09D 7/12 (2013.01)

(58) Field of Classification Search
CPC .............. B05D 3/00; B05D 5/00; C09D 7/12; C08G 77/58; B01J 13/00; B01J 13/0039; B01J 13/0047; C01G 23/053
USPC .............. 516/90; 977/776; 527/837; 427/387
See application file for complete search history.

(56) References Cited

U.S. PATENT DOCUMENTS 2,443,735 A * 6/1948 Kropa .............................. 525/49
2,572,876 A * 10/1951 Rust et al. ........................ 528/24
(Continued)

FOREIGN PATENT DOCUMENTS

CN 1253119 5/2000
EP 0846494 A1 6/1998
(Continued)

OTHER PUBLICATIONS

Ichinose et al., "Properties of Anatase Films for photocatlyst from peroxotitanic acid solution and peroxo-Modified Anatase sol", J. Cer. Soc. of Japan, International Edition, Vo. 104, No. 10, (Oct. 1996) pp. 909-912.

(Continued)

Primary Examiner — Daniel S Metzmaier
(74) Attorney, Agent, or Firm — Fraser Clemens Martin & Miller LLC; William J. Clemens

(57) ABSTRACT

A hybrid film-forming composition is prepared by forming an aqueous mixture including an organofunctional silane, a metal chloride, and an acid, and boiling the mixture. A base is added to the aqueous mixture to substantially neutralize the mixture and to form a hydroxide of the metal. A colloidal suspension including the metal hydroxide and a siloxy compound is formed. A peroxide-based solution is added to the suspension to form a suspension including a peroxide of the metal. The suspension is allowed to equilibrate at room temperature. The suspension is boiled at a pressure greater than atmospheric pressure to form a hybrid film-forming composition including the condensation product of a siloxy compound and a metal peroxide. A coating formed from the hybrid film-forming composition may be hydrophobic or hydrophilic.

30 Claims, 6 Drawing Sheets

Related U.S. Application Data continuation-in-part of application No. 12/167,863, filed on Jul. 3, 2008, now abandoned, which is a continuation-in-part of application No. 11/963,380, filed on Dec. 21, 2007, now abandoned.

(51) Int. Cl.
  *C01G 23/053* (2006.01)
  *C09D 7/12* (2006.01)

(56) References Cited

U.S. PATENT DOCUMENTS

| | | | |
|---|---|---|---|
| 3,021,239 A * | 2/1962 | Lindenfelser et al. | 428/337 |
| 4,820,748 A | 4/1989 | Yamamori et al. | |
| 4,968,772 A * | 11/1990 | Whiteside | 528/230 |
| 5,091,009 A | 2/1992 | Nogami et al. | |
| 5,403,513 A | 4/1995 | Sato et al. | |
| 5,755,867 A | 5/1998 | Chikuni et al. | |
| 5,759,251 A | 6/1998 | Nakamura et al. | |
| 5,762,913 A | 6/1998 | Tanaka et al. | |
| 5,939,194 A | 8/1999 | Hashimoto et al. | |
| 6,013,372 A | 1/2000 | Hayakawa et al. | |
| 6,090,489 A | 7/2000 | Hayakawa et al. | |
| 6,099,969 A | 8/2000 | Ogata | |
| 6,107,241 A | 8/2000 | Ogata et al. | |
| 6,165,256 A | 12/2000 | Hayakawa et al. | |
| 6,210,451 B1 * | 4/2001 | Chopin et al. | 44/357 |
| 6,235,401 B1 | 5/2001 | Ogata et al. | |
| 6,296,943 B1 | 10/2001 | Watanabe et al. | |
| 6,303,730 B1 * | 10/2001 | Fries et al. | 528/32 |
| 6,335,061 B1 | 1/2002 | Kanamori et al. | |
| 6,344,277 B1 | 2/2002 | Ogata et al. | |
| 6,344,278 B1 | 2/2002 | Ogata et al. | |
| 6,379,811 B2 | 4/2002 | Ogata et al. | |
| 6,420,437 B1 | 7/2002 | Mori et al. | |
| 6,429,169 B1 | 8/2002 | Ichinose | |
| 6,485,838 B1 | 11/2002 | Shimada et al. | |
| 6,524,664 B1 | 2/2003 | Hashimoto et al. | |
| 6,565,641 B1 | 5/2003 | Isozaki | |
| 6,579,929 B1 * | 6/2003 | Cole et al. | 524/492 |
| 6,602,918 B1 | 8/2003 | Ichinose | |
| 6,733,580 B2 | 5/2004 | Isozaki | |
| 6,736,890 B2 | 5/2004 | Haruta et al. | |
| 6,770,130 B2 | 8/2004 | Kato et al. | |
| 6,770,257 B1 | 8/2004 | Imura et al. | |
| 6,830,785 B1 | 12/2004 | Hayakawa et al. | |
| 6,858,294 B1 | 2/2005 | Tanaka et al. | |
| 6,884,752 B2 | 4/2005 | Andrews | |
| 6,962,946 B2 | 11/2005 | Brady et al. | |
| 6,994,890 B2 | 2/2006 | Ohlhausen et al. | |
| 7,090,823 B1 | 8/2006 | Liu | |
| 7,175,825 B2 | 2/2007 | Nakano et al. | |
| 7,205,049 B2 | 4/2007 | Andrews | |
| 7,208,229 B2 | 4/2007 | Suzuki et al. | |
| 7,261,942 B2 | 8/2007 | Andrews | |
| 7,294,365 B2 | 11/2007 | Hayakawa et al. | |
| 7,297,206 B2 | 11/2007 | Naruse et al. | |
| 7,303,738 B2 | 12/2007 | Okusako | |
| 7,419,718 B2 | 9/2008 | Ogata et al. | |
| 7,659,226 B2 | 2/2010 | Tucker | |
| 8,709,296 B2 * | 4/2014 | Kiyoshima et al. | 252/514 |
| 2002/0016250 A1 | 2/2002 | Hayakawa et al. | |
| 2003/0152704 A1 | 8/2003 | Haruta et al. | |
| 2004/0024075 A1 * | 2/2004 | Dongare et al. | 521/153 |
| 2005/0147759 A1 | 7/2005 | Andrews | |
| 2005/0234178 A1 | 10/2005 | Andrews | |
| 2005/0271892 A1 | 12/2005 | Ogata et al. | |
| 2005/0279255 A1 | 12/2005 | Suzuki et al. | |
| 2007/0248790 A1 | 10/2007 | Ogata | |
| 2008/0035025 A1 | 2/2008 | Andrews | |
| 2008/0166478 A1 | 7/2008 | Kameshima et al. | |
| 2008/0241557 A1 | 10/2008 | Hoshi et al. | |
| 2013/0055927 A1 * | 3/2013 | Satoh et al. | 106/481 |

FOREIGN PATENT DOCUMENTS

| | | |
|---|---|---|
| EP | 0854112 A1 | 7/1998 |
| EP | 1310579 A1 | 5/2003 |
| EP | 0816466 B1 | 5/2006 |
| EP | 1873218 A1 | 2/2008 |
| JP | 03258879 A | 11/1991 |
| JP | 9071418 | 3/1997 |
| JP | 9227159 | 9/1997 |
| JP | 10067516 | 3/1998 |
| JP | 10156999 | 6/1998 |
| JP | 2000247639 | 9/2000 |
| JP | 2001048538 | 1/2001 |
| JP | 2006022370 A | 1/2006 |
| JP | 2007118556 A | 5/2007 |
| KR | 2005050740 | 6/2005 |
| WO | WO 2006/129973 A1 * | 12/2006 |

OTHER PUBLICATIONS

Ichinose et al., "Synthesis of peroxo-Modified Anatase sol from peroxo Titanic Acid Solution", Journal of the Ceramic Society of Japan, International Edition, vol. 104, No. 8, (Aug. 1996) pp. 697-700.

Chemical Abstracts, vol. 120, No. 8, Feb. 21, 1994 Columbus, Ohio, US; FANG: XP002139805 *abstract* & Wuhan Daxue Xueba, Ziran Kexubean, vol. 3, 1992, pp. 78-82, china, AN 120: 80604.

Chemical Abstracts, vol. 108, No. 14, Apr. 4, 1988 Columbus, Ohio, US; Abstract No. 115112, Sato, Goro: XP002139806 *abstract* & JP 62 283817 A (Catalyst and Chemicals Industries).

Katzoff, S., et al.; "The Solution of Titanic Hydroxide in Hydrogen Peroxide;" J. Am. Chem. Soc., vol. 57, No. 7, p. 1384, (Jul. 1935).

Ichinose, Hiromichi; "Properties of Peroxotitanium Acid Solution and Peroxo-Modified Anatase Sol Derived From Peroxotitanium Hydrate;" Journal of Sol-Gel Science & Technology, vol. 22, 2001, pp. 33-40, (2001—month unavailable).

International Search Report and Written Opinion, International Application No. PCT/US2008/053542, dated Mar. 6, 2009, 16 pages.

Walcarius, A., Electrochemical Applications of Silica-Based Organic Inorganic Hybrid Materials, Chemistry of Materials, Oct. 2001, vol. 13, No. 10, pp. 3351-3372.

International Search Report and Written Opinion, International Application No. PCT/US2008/087823, dated Jul. 15, 2009, 13 pages.

International Search Report and Written Opinion, International Application No. PCT/US2008/087823, dated Jul. 1, 2010, 7 pages.

MSDS, "Dow Corning® Q2-5211 Superwetting Agent", Dow Corning Corp., Midland, MI, USA (Nov. 2010), Obtained online @ http://www.dowcorning.com/applications/search/products/details.aspx?prod=02008505&type=PROD&bhcp=1, pp. 1-9.

Machine Translation of JP 2006-022370 A (patent application published Jan. 26, 2006), obtained @ http://www.ipdl.inpit.go.jp/homepg_e.ipdl, (downloaded Nov. 16, 2010), pp. 1-29.

Derwent Abstract, week 200611, London: Derwent Publications Ltd., AN2006-105225, Class A14, JP 2006022370 A (Kansai Paint Co Ltd.), abstract.

Derwent Abstract week 199614, London: Derwent Publications Ltd., AN 1992-004574, Class A32, JP 03258879 A, (Toyo Ink Mfg Co), abstract.

USPTO Non-Final Office Action in U.S. Appl. No. 11/963,380, mailed Nov. 24, 2010, 17 pages.

USPTO Non-Final Office Action in U.S. Appl. No. 12/202,076, mailed Apr. 4, 2011, 14 pages.

USPTO Non-Final Office Action in U.S. Appl. No. 12/167,863, mailed Apr. 7, 2011, 15 pages.

USPTO Non-Final Office Action in U.S. Appl. No. 12/340,207, mailed Sep. 2, 2011, 25 pages.

USPTO Non-Final Office Action in U.S. Appl. No. 11/679,058, mailed Feb. 9, 2009, 12 pages.

* cited by examiner

⋏ = Si(OO)$_4^-$ or Zr(OO)$_4^-$ or Ti(OO)$_4^-$
\+ = NH$_4^+$
∧ = H$_2$O

HYBRID VEHICLE SYSTEMS

CROSS-REFERENCE TO RELATED APPLICATIONS

This application is a continuation of U.S. application Ser. No. 12/340,207, filed Dec. 19, 2008, now abandoned, which is a continuation-in-part of U.S. application Ser. No. 12/202,076, filed Aug. 29, 2008, now abandoned, which is a continuation-in-part of U.S. application Ser. No. 12/167,863, filed Jul. 3, 2008, now abandoned, which is a continuation-in-part of U.S. application Ser. No. 11/963,380, filed Dec. 21, 2007, now abandoned, all of which are incorporated by reference herein in their entirety.

TECHNICAL FIELD

This invention relates to aqueous hybrid metal oxide polymeric vehicle systems.

BACKGROUND

Photocatalytically-active, self-cleaning aqueous coating compositions and methods are known in the art. Compositions containing a metal peroxide have been used to form clear, colorless adhesive coatings on substrates, including micro particulate substrates. Coating compositions with nanoparticles have been used to bind the nanoparticles to a substrate.

SUMMARY

In one aspect, a composition includes an aqueous carrier and the condensation product of an organofunctional silane and a transition metal peroxide. In certain implementations, the composition includes crystalline nano-sized particles. The nano-sized particles include a transition metal oxide. At least some of the nano-sized particles are less than about 10 nm in diameter. In some embodiments, the transition metal of the transition metal peroxide is the same as the transition metal of the transition metal oxide. The transition metal can be selected from the group consisting of titanium, zinc, and combinations thereof.

In some implementations, the composition includes an additive selected from the group consisting of an organometallic compound, a wetting agent, an organic compound, a metal, and combinations thereof. In some cases, the composition includes a filler. The filler can be substantially inert. The filler can include, for example, carbon nanotubes. The weight of the filler can be greater than the weight of the transition metal in the composition.

In another aspect, a method for preparing a composition includes providing a first mixture, and boiling the first mixture at a pressure greater than atmospheric pressure to form a composition. The first mixture includes an organofunctional silane, a transition metal peroxide, and an aqueous carrier. The composition that is formed includes the aqueous carrier and the condensation product of the organofunctional silane and the transition metal peroxide.

In some implementations, the composition formed by boiling the first mixture at a pressure greater than atmospheric pressure further includes crystalline nano-sized particles. The nano-sized particles include a transition metal oxide. At least some of the nano-sized particles are less than about 10 nm in diameter. In some cases, the first mixture includes at least one additive selected from the group consisting of an organometallic compound, a wetting agent, an organic compound, a metal, a metal salt, a filler, and combinations thereof. The first mixture can be in the form of a colloidal suspension. The organofunctional silane may be, for example, bis(triethoxysilyl)methane, 1,1,3,3-tetramethyl-1,3-diethoxydisiloxane, octochloro-trisiloxane, tetraethoxysilane, or any combination thereof.

In certain implementations, the method further includes combining an aqueous solution including a peroxide with a colloidal suspension including an amorphous metal hydroxide in an aqueous carrier to form a colloidal suspension. The colloidal suspension includes the transition metal peroxide. The method can also include combining a transition metal salt and an acid with an aqueous carrier to form a second mixture, substantially neutralizing the second mixture, filtering the second mixture to form an amorphous metal hydroxide, and suspending the amorphous metal hydroxide in an aqueous carrier to form the colloidal suspension.

Other implementations include compositions prepared according to the above-described methods.

In another aspect, a method for preparing an article includes providing a composition including an aqueous carrier and the condensation product of an organofunctional silane and a transition metal peroxide, applying the composition to a surface of a substrate, and removing the aqueous carrier to form an article with a coating on the surface of the substrate. In some embodiments, the coating is removed from the substrate to form nano-sized particles in powder form.

In some implementations, the composition includes crystalline nano-sized particles. The nano-sized particles include a transition metal oxide. A thickness of the coating can be less than about 10 nm. The coating is covalently bonded to the surface of the substrate. In some embodiments, the substrate is porous. In certain embodiments, the substrate is particulate.

In one aspect, a composition includes an aqueous carrier and the condensation product of a silicon peroxide and a transition metal peroxide. In another aspect, preparing a composition includes providing a first mixture, and boiling the first mixture at a pressure greater than atmospheric pressure to form a composition. The first mixture includes a silicon peroxide, a transition metal peroxide, and an aqueous carrier. The composition that is formed includes the aqueous carrier and the condensation product of the silicon peroxide and the transition metal peroxide. In another aspect, preparing an article includes providing a composition including an aqueous carrier and the condensation product of a silicon peroxide and a transition metal peroxide, applying the composition to a surface of a substrate, and removing the aqueous carrier to form an article including a hybrid metal oxide coating on the surface of the substrate.

In certain implementations, the composition includes crystalline particles less than about 10 nm in diameter. The particles can include a hybrid metal oxide, a transition metal oxide, or a combination thereof. The composition can include silicon oxide and transition metal oxide. A weight percentage of the silicon oxide, based on total metal oxide, can be at least about 50 wt %, at least about 95 wt %, or at least about 99 wt %. A weight percentage of the transition metal oxide, based on total metal oxide, can be at least about 95 wt %. In some cases, the condensation product includes silicon, titanium, zirconium, or any combination thereof.

In some implementations, the composition formed by boiling the first mixture at a pressure greater than atmospheric pressure includes crystalline particles less than about 10 nm in diameter. The crystalline particles can include a hybrid metal oxide, a transition metal oxide, or any combination thereof. The first mixture can be in the form of a colloidal suspension. In some cases, an aqueous solution including a peroxide is combined with a colloidal suspension including an amorphous metal hydroxide and a silicon hydroxide in an aqueous carrier to form a colloidal suspension including the transition metal peroxide and the silicon peroxide. In some embodiments, a silicon chloride, a transition metal chloride, and an acid are combined with an aqueous carrier to form a mixture. The mixture can be neutralized and filtered to form an amorphous metal hydroxide and a silicon hydroxide. The amorphous metal hydroxide and a silicon hydroxide can be suspended in an aqueous carrier to form a colloidal suspension including amorphous metal hydroxide and silicon hydroxide.

In some implementations, preparing the composition includes providing a mixture including a silicon peroxide, a transition metal peroxide, and an aqueous carrier. The mixture can be boiled at a pressure greater than atmospheric pressure to form a composition including the aqueous carrier and the condensation product of the silicon peroxide and the transition metal peroxide. In certain implementations, the composition includes crystalline nano-sized particles including a transition metal oxide.

In one aspect, a composition includes an aqueous carrier and the condensation product of an organofunctional silane and a transition metal peroxide. In certain implementations, the composition includes crystalline nano-sized particles. The nano-sized particles include a transition metal oxide. At least some of the nano-sized particles are less than about 10 nm in diameter. In some embodiments, the transition metal of the transition metal peroxide is the same as the transition metal of the transition metal oxide. The transition metal can be selected from the group consisting of titanium, zinc, and combinations thereof.

In some implementations, the composition includes an additive selected from the group consisting of an organometallic compound, a wetting agent, an organic compound, a metal, and combinations thereof. In some cases, the composition includes a filler. The filler can be substantially inert. The filler can include, for example, carbon nanotubes. The weight of the filler can be greater than the weight of the transition metal in the composition.

In another aspect, a method for preparing a composition includes providing a first mixture, and boiling the first mixture at a pressure greater than atmospheric pressure to form a composition. The first mixture includes an organofunctional silane, a transition metal peroxide, and an aqueous carrier. The composition that is formed includes the aqueous carrier and the condensation product of the organofunctional silane and the transition metal peroxide.

In some implementations, the composition formed by boiling the first mixture at a pressure greater than atmospheric pressure further includes crystalline nano-sized particles. The nano-sized particles include a transition metal oxide. At least some of the nano-sized particles are less than about 10 nm in diameter. In some cases, the first mixture includes at least one additive selected from the group consisting of an organometallic compound, a wetting agent, an organic compound, a metal, a metal salt, a filler, and combinations thereof. The first mixture can be in the form of a colloidal suspension.

In certain implementations, the method further includes combining an aqueous solution including a peroxide with a colloidal suspension including an amorphous metal hydroxide in an aqueous carrier to form a colloidal suspension. The colloidal suspension includes the transition metal peroxide. The method can also include combining a transition metal salt and an acid with an aqueous carrier to form a second mixture, substantially neutralizing the second mixture, filtering the second mixture to form an amorphous metal hydroxide, and suspending the amorphous metal hydroxide in an aqueous carrier to form the colloidal suspension.

In another aspect, a method for preparing an article includes providing a composition including an aqueous carrier and the condensation product of an organofunctional silane and a transition metal peroxide, applying the composition to a surface of a substrate, and removing the aqueous carrier to form an article with a coating on the surface of the substrate. In some embodiments, the coating is removed from the substrate to form nano-sized particles in powder form.

In some implementations, the composition includes crystalline nano-sized particles. The nano-sized particles include a transition metal oxide. A thickness of the coating can be less than about 10 nm. The coating is covalently bonded to the surface of the substrate. In some embodiments, the substrate is porous. In certain embodiments, the substrate is particulate.

In one aspect, a hybrid film-forming composition is prepared by forming an aqueous mixture including an organofunctional silane, a metal chloride, and an acid. A base is added to the aqueous mixture to substantially neutralize the mixture and to form a hydroxide of the metal. A colloidal suspension including the metal hydroxide and a siloxy compound is formed. A peroxide-based solution is added to the suspension to form a suspension including a peroxide of the metal. The suspension is allowed to equilibrate at room temperature. The suspension is boiled at a pressure greater than atmospheric pressure to form a hybrid film-forming composition including the condensation product of a siloxy compound and a metal peroxide. In some implementations, the aqueous mixture is heated or boiled before the base is added to the mixture.

In some implementations, a pH of the aqueous mixture before neutralization may be less than 1. The metal chloride may include a chloride of silicon, titanium, zirconium, tin, vanadium, gallium, germanium, tellurium, hafnium, rhenium, iridium, platinum, or any combination of two or more chlorides of silicon, titanium, zirconium, tin, vanadium, gallium, germanium, tellurium, hafnium, rhenium, iridium, or platinum. The metal chloride may be a tetrachloride. The organofunctional silane may be, for example, bis(triethoxysilyl)methane, 1,1,3,3-tetramethyl-1,3-diethoxydisiloxane, octochloro-trisiloxane, tetraethoxysilane, or any combination thereof.

In another aspect, preparing an article includes providing a composition including an aqueous carrier and the condensation product of a siloxy compound and a metal peroxide. The composition is applied to a surface of a substrate, and the aqueous carrier is removed to form an article with a siloxy-peroxy hybrid metal coating on the surface of the substrate.

In certain implementations, the composition includes crystalline particles less than about 10 nm in diameter. The particles can include a hybrid metal oxide, a transition metal oxide, or a combination thereof. The composition can include silicon oxide and transition metal oxide. A weight percentage of the silicon oxide, based on total metal oxide, can be at least about 50 wt %, at least about 95 wt %, or at least about 99 wt %. A weight percentage of the transition metal oxide, based on total metal oxide, can be at least about 95 wt %. In some cases, the condensation product includes silicon, titanium, zirconium, or any combination thereof.

In some implementations, the composition formed by boiling the first mixture at a pressure greater than atmospheric pressure includes crystalline particles less than about 10 nm in diameter. The crystalline particles can include a hybrid metal oxide, a transition metal oxide, or any combination thereof. The first mixture can be in the form of a colloidal suspension. In some cases, an aqueous solution including a peroxide is combined with a colloidal suspension including an amorphous metal hydroxide and a silicon hydroxide in an aqueous carrier to form a colloidal suspension including the transition metal peroxide and the silicon peroxide. In some embodiments, a silicon chloride, a transition metal chloride, and an acid are combined with an aqueous carrier to form a mixture. The mixture can be neutralized and filtered to form an amorphous metal hydroxide and a silicon hydroxide. The amorphous metal hydroxide and a silicon hydroxide can be suspended in an aqueous carrier to form a colloidal suspension including amorphous metal hydroxide and silicon hydroxide.

In some implementations, preparing the composition includes providing a mixture including a silicon peroxide, a transition metal peroxide, and an aqueous carrier. The mixture can be boiled at a pressure greater than atmospheric pressure to form a composition including the aqueous carrier and the condensation product of the silicon peroxide and the transition metal peroxide. In certain implementations, the composition includes crystalline nano-sized particles including a transition metal oxide.

In one aspect, a composition includes an aqueous carrier and the condensation product of an organofunctional silane and a transition metal peroxide. In certain implementations, the composition includes crystalline nano-sized particles. The nano-sized particles include a transition metal oxide. At least some of the nano-sized particles are less than about 10 nm in diameter. In some embodiments, the transition metal of the transition metal peroxide is the same as the transition metal of the transition metal oxide. The transition metal can be selected from the group consisting of titanium, zinc, and combinations thereof.

In some implementations, the composition includes an additive selected from the group consisting of an organometallic compound, a wetting agent, an organic compound, a metal, and combinations thereof. In some cases, the composition includes a filler. The filler can be substantially inert. The filler can include, for example, carbon nanotubes. The weight of the filler can be greater than the weight of the transition metal in the composition.

In another aspect, a method for preparing a composition includes providing a first mixture, and boiling the first mixture at a pressure greater than atmospheric pressure to form a composition. The first mixture includes an organofunctional silane, a transition metal peroxide, and an aqueous carrier. The composition that is formed includes the aqueous carrier and the condensation product of the organofunctional silane and the transition metal peroxide.

In some implementations, the composition formed by boiling the first mixture at a pressure greater than atmospheric pressure further includes crystalline nano-sized particles. The nano-sized particles include a transition metal oxide. At least some of the nano-sized particles are less than about 10 nm in diameter. In some cases, the first mixture includes at least one additive selected from the group consisting of an organometallic compound, a wetting agent, an organic compound, a metal, a metal salt, a filler, and combinations thereof. The first mixture can be in the form of a colloidal suspension.

In certain implementations, the method further includes combining an aqueous solution including a peroxide with a colloidal suspension including an amorphous metal hydroxide in an aqueous carrier to form a colloidal suspension. The colloidal suspension includes the transition metal peroxide. The method can also include combining a transition metal salt and an acid with an aqueous carrier to form a second mixture, substantially neutralizing the second mixture, filtering the second mixture to form an amorphous metal hydroxide, and suspending the amorphous metal hydroxide in an aqueous carrier to form the colloidal suspension.

In another aspect, a method for preparing an article includes providing a composition including an aqueous carrier and the condensation product of an organofunctional silane and a transition metal peroxide, applying the composition to a surface of a substrate, and removing the aqueous carrier to form an article with a coating on the surface of the substrate. In some embodiments, the coating is removed from the substrate to form nano-sized particles in powder form.

In some implementations, the composition includes crystalline nano-sized particles. The nano-sized particles include a transition metal oxide. A thickness of the coating can be less than about 10 nm. The coating may be hydrophilic or hydrophobic. The contact angle of water on the hydrophilic coating may be less than about 20°, less than about 10°, or less than about 5°. The coating is covalently bonded to the surface of the substrate. In some embodiments, the substrate is porous. In certain embodiments, the substrate is particulate.

Implementations can include compositions and articles prepared according to the above-described processes, as well as any combination of the above features.

Other features will be apparent from the description, the drawings, and the claims.

DESCRIPTION OF DRAWINGS

Like reference symbols in the various drawings indicate like elements.

DETAILED DESCRIPTION

Figure 1:
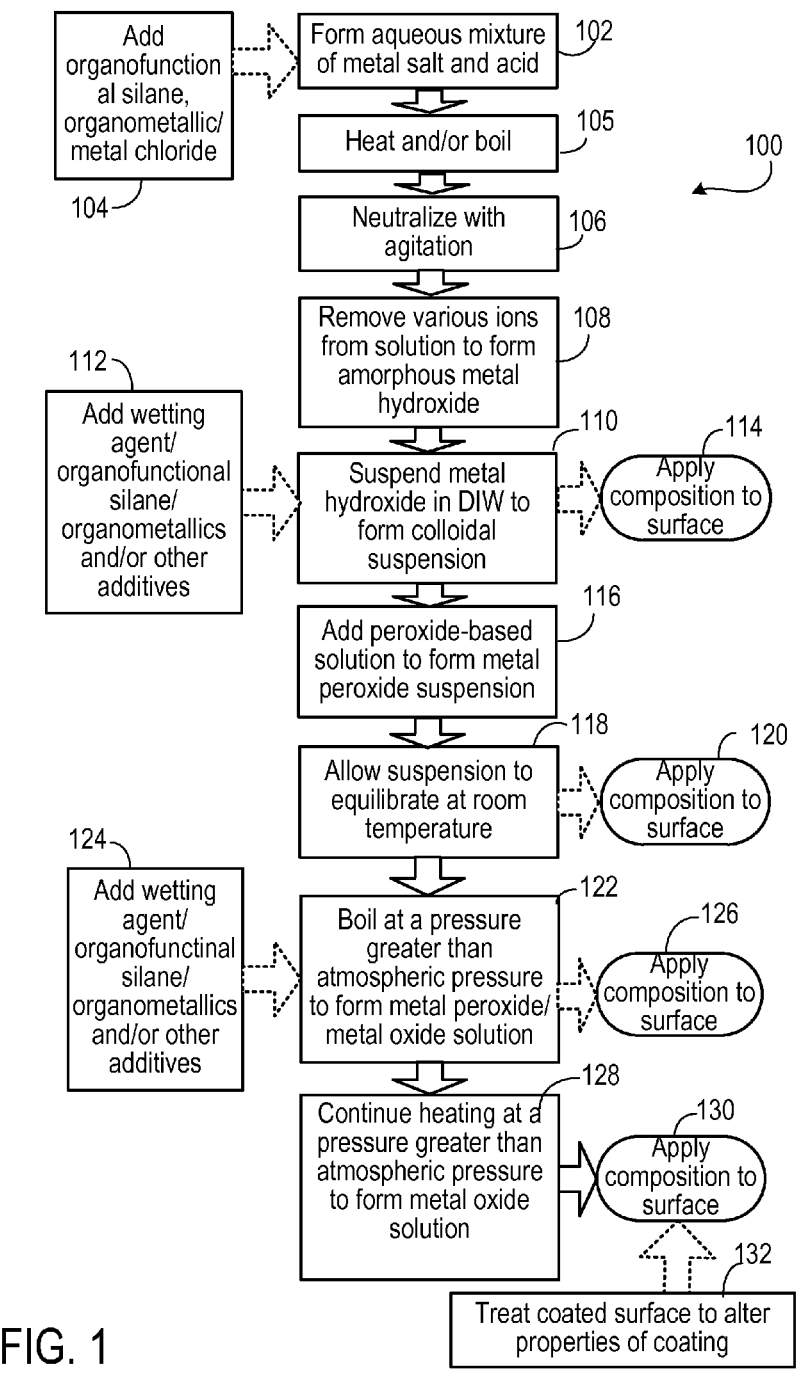
FIG. 1 is a flow chart of a procedure for forming aqueous polymeric molecular hybrid nanocrystals.

A solution or aqueous dispersion of polymeric molecular hybrid nanocrystals can be prepared following a sequence of steps combining selected reactants and additives under certain reaction conditions. Compositions including a solution or aqueous dispersion of polymeric molecular hybrid nanocrystals can be applied to macro or micro surfaces (such as microparticle powders) to form a protective and/or functional coating with metal oxides, metals, and other optional components. The coatings can include nanofilms and composite films formed from vehicle systems having nanohybrid crystals that can also be used as an inorganic vehicle system for dispersion of nanoparticles. The compositions can be used to prepare nanopowders and nanocomposite powders, as well as vaporized nanoparticles, in addition to coatings.

As used herein, "substrate" generally refers to a solid object of any size. For instance, a substrate can be a window, a microchip, or a plurality of particles, such as nanoparticles or micron-sized particles. In some cases, compositions described herein are mixed with a substrate rather than, or in addition to, applying the composition to a surface of the substrate to alter bulk properties of the substrate. Mixing a composition with a substrate includes dispersing the composition in the substrate such that the composition is distributed substantially homogeneously throughout the substrate. For example, if the substrate is cement, a composition or components of a composition can be mixed into dry cement or into prepared (wet) cement. As another example, a composition can be mixed into a molten material that will form a glass prior to cooling so that components of the composition are dispersed within the glass.

Polymeric molecular hybrid nanocrystal (PMHNC) compositions can include additives such as transition metal salts, organofunctional silanes, organometallic compounds, wetting agents (including non-reactive silanes), other reactive and/or non-reactive (or substantially inert) organic and/or inorganic compounds, and any combination thereof. These aqueous compositions include at least about 90%, at least about 95%, or at least about 98% water. Temperature, pressure, and pH of the aqueous reaction mixture are selectively controlled throughout the preparation of a PMHNC composition.

Components of the aqueous inorganic PMHNCs described herein can be chosen to form coatings that have catalytic, photocatalytic, anti-microbial, anti-viral, anti-fungal, anti-corrosive, anti-fouling, semi-conductive, conductive, insulative, electromagnetic, transparent, optical, emissive, flame retardant, piezoelectric, and other selected properties. Coatings formed from the compositions described herein can be instrumental in air/water remediation, bio-medical applications, thermoset-thermoplastic reinforcement, pigment dispersion, hydrogen storage, dye-sensitized solar cells, and super capacitor thin films, with uses in electrical applications, surface studies, optics, increased refractive index coatings, electro-optics, acousto-optics, laser optics, etc.

Referring to FIG. 1, a procedure 100 depicts preparation of an aqueous PMHNC composition. Initially, an amorphous metal hydroxide mixture is prepared. In step 102, an acidic aqueous mixture of one or more metal salts (including, for example, metal $M^1$) is formed. The metal salts can be transition metal chloride or halide salts of one or more metals such as silicon, titanium, vanadium, gallium, germanium, zirconium, tin, tellurium, hafnium, rhenium, iridium, and platinum. In some embodiments, the metal salts are metal tetrachlorides.

A pH of the mixture is less than about 1. Acids used to acidify the mixture may be strong acids such as, for example, hydrochloric acid, hydrofluoric acid, nitric acid, and sulfuric acid, or any combination thereof. Other acids that may be used include, but are not limited to, acetic acid, arginine, azelaic acid, behenic acid, benzenesulfonic acid, boric acid, butyric acid, capric acid, castor oil acid, chromic acid, docosanic acid, dodecylbenesulfonic acid, fluohydric acid, fluosilicaten, formic acid, fumaric acid, glutamine, glycine, hydrocyanic acid, hydroxyproline, hydroxystearic acid, isophthalic acid, lauric acid, linoleic acid, lysine, malonic acid, metat-phthalic acid, methionine, myristic acid, oleic acid, ortho-phthalic acid, orthophosphoric acid, oxalic acid, palmitic acid, para-phthalic acid, para-toluenesulfonic acid, phenylanaline, phosphoric acid, phosphorus acid, phthalic acid, pimelic acid, polyphosphoric acid, propionic acid, ricinoleic acid, sodium formate, stearic acid, succinic acid, sulfanilic acid, sulfamic acid, tartaric acid, terephthalic acid, toluenesulfonic acid, and other amino acids, carboxylic acids, carboxylic chlorides, chloride acids, dicarboxylic acids, fatty acids, halide acids, organic acids, organic diacids, polycarboxylic acids, and any combination thereof.

Step 104 includes the optional addition of one or more additional metal salts (including, for example, metal $M^2$, which can be a transition metal), organometallic compounds (including, for example, $M^3$, which can be a transition metal), an organofunctional silane, or combinations thereof, to the mixture formed in step 102. Any of $M^1$, $M^2$, and $M^3$ can be the same or different.

The metal salts are chosen to impart desirable properties to the PMHNC composition. For example, a zinc salt such as $ZnCl_2$ can be added to impart anti-corrosion properties. In some cases, metals are chosen for a desired solubility at a given pH in the process depicted in FIG. 1. Alternatively, the pH of a composition in the process can be adjusted to achieve a desired solubility of a selected metal salt.

In some embodiments, the second metal salt is a metal chloride. The metal chloride can be a tetrachloride salt such as, for example, $SiCl_4$, $TiCl_4$, $GeCl_4$, $VCl_4$, $GaCl_4$, $ZrCl_4$, $SnCl_4$, $TeCl_4$, $HfCl_4$, $ReCl_4$, $IrCl_4$, $PtCl_4$, or other chloride salts such as, for example, $Na_2PtCl_6$, $CCl_3CO_2Na$, $Na_2PdCl_4$, $NaAuCl_4$, $NaAlCl_4$, $ClNaO_3$, $MgCl_2$, $AlCl_3$, $POCl_3$, $PCl_5$, $PCl_3$, $KCl$, $MgKCl_3$, $LiCl.KCl$, $CaCl_2$, $FeCl_2$, $MnCl_2$, $Co(ClO_4)_2$, $NiCl_2$, $Cl_2Cu$, $ZnCl_2$, $GaCl_3$, $SrCl_2$, $YCl_3$, $MoCl_3$, $MoCl_5$, $RuCl_3$, $RhCl_3$, $PdCl_2$, $AsCl_3$, $AgClO_4$, $CdCl_2$, $SbCl_5$, $SbCl_3$, $BaCl_2$, $CsCl$, $LaCl_3$, $CeCl_3$, $PrCl_3$, $SmCl_3$, $GdCl_3$, $TbCl_3$, $HoCl_3$, $ErCl_3$, $TmCl_3$, $YbCl_3$, $LuCl_3$, $WCl_6$, $ReCl_5$, $ReCl_3$, $OsCl_3$, $IrCl_3$, $PtCl_2$, $AuCl$, $AuCl_3$, $Hg_2Cl_2$, $HgCl_2$, $HgClO_4$, $Hg(ClO_4)_2$, $TlCl_3$, $PbCl_2$, $BiCl_3$, $GeCl_3$, $HfCl_2O$, $Al_2Cl_6$, $BiOCl$, $[Cr(H_2O)_4Cl_2]Cl_2.2H_2O$, $CoCl_2$, $DyCl_3.6H_2O$, $EuCl_2$, $EuCl_3.6H_2O$, $NH_4AuCl.xH_2O$, $HAuCl.xH_2O$, $KAuCl_4$, $NaAuCl.xH_2O$, $InCl_3$, $(NH_4)_3IrCl_6$, $K_2IrCl_6$, $MgCl_2.6H_2O$, $NdCl_3$, $(NH_4)_2OsCl_6$, $(NH_4)_2PdCl_6$, $Pd(NH_3)_2Cl_2$, $[Pd(NH_3)]_4Cl_2.H_2O$, $(NH_4)_2PtCl_6$, $Pt(NH_3)_2Cl_2$, $Pt(NH_3)_2Cl_2$, $[Pt(NH_3)_4]Cl_2.xH_2O$, $[Pt(NH_3)_4][PtCl_4]$, $K_2PtCl_4$, $KClO_4$, $K_2ReCl_6$, $(NH_4)_3RhCl_6$, $[RhCl(CO)((C_6H_5)3P)_2]$, $[RhCl(C_6H_5)3P)_3]$, $[Rh(NH_3)_5Cl]Cl_2$, $K_3RhCl_6$, $RbCl$, $RbClO_4$, $(NH_4)_2RuCl_6$, $[RuCl_2((C_6H_5)_3P)_3]$, $\{Ru(NH_3)_6\}Cl_2$, $K_2RuCl_6$, $ScCl_3.xH_2O$, $AgCl$, $NaCl$, $TlCl$, $SnCl_2$, and additional water adducts thereof.

In some cases, PMHNC compositions are used to chemically bind other organometallic compounds (for example, in a monomeric/oligomeric/polymeric network or matrix), providing an inorganic vehicle system that allows inclusion of organometallic compounds. Desired properties of a film or coating are enhanced by adding selected organometallic compounds to impart or enhance properties such as mechanical strength, electrical conductivity, corrosion resistance, anti-fouling characteristics, etc.

Figure 2:
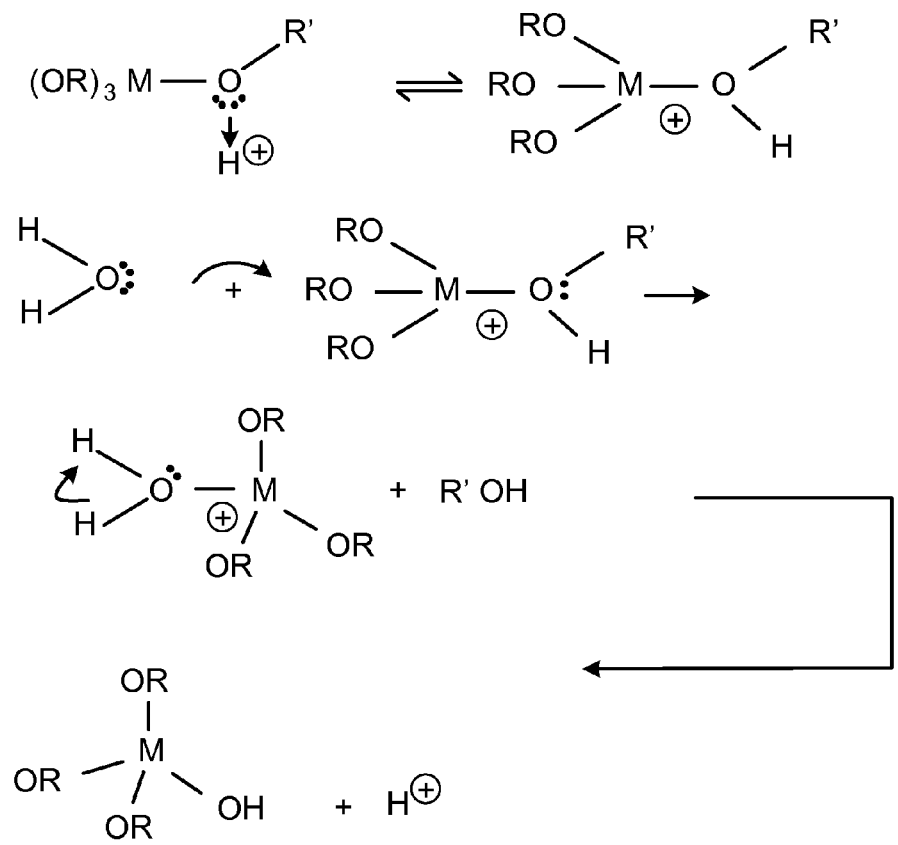
FIG. 2 depicts a hydrolysis reaction of a metal alkoxide.

Organometallic compounds added in optional step 104 can be chosen such that one or more organic substituents undergo hydrolytic cleavage in the acidic mixture in step 102, as shown in FIG. 2. Organometallic compounds added in optional step 104 can include, for instance, metal alkoxides such as methoxides, ethoxides, methoxyethoxides, butoxides, isopropoxides, pentoxides, etc., as well as pentadionates, proprionates, acetates, hydroxides, hydrates, stearates, oxalates, sulfates, carbonates, and/or acetylacetonates, etc., of metals such as zinc, tungsten, titanium, tantalum, tin, molybdenum, magnesium, lithium, lanthanum, indium, hafnium, gallium, iron, copper, boron, bismuth, antimony, barium, zirconium, zinc, yttrium, vanadium, tin, silver, platinum, palladium, samarium, praseodymium, nickel, neodymium, manganese, magnesium, lithium, lanthanum, indium, holmium, hafnium, gallium, gadolinium, iron, europium, erbium, dysprosium, copper, cobalt, chromium, cesium, cerium, aluminum, barium, beryllium, cadmium, calcium, iridium, arsenic, germanium, gold, lutetium, niobium, potassium, rhenium, rhodium, rubidium, ruthenium, scandium, selenium, silicon, strontium, tellurium, terbium, thulium, thorium, ytterbium, and yttrium.

Organofunctional silanes added in step 104 promote adhesion between organic polymers and inorganic substrates and act as crosslinkers and hardeners for binder systems. Bonding strength and hardness (or abrasion resistance) of a film or coating formed on a substrate are increased by the addition of organofunctional silanes in step 104 during preparation of a composition to form peroxy metal hydroxy silane (PMHS) monomers, which polymerize to form an inorganic polymeric PMHNC composition. As used herein, "PMHS monomers" generally refers to monomers including a metal peroxide species covalently bonded to a metal silanol species to form a structure such as a silicate matrix ($-\text{Si(OH)}_y-\text{O-M}^1(\text{OOH})_x-\text{O}-\text{Si(OH)}_y-$). As used herein, "organofunctional silane" generally refers to a silicon-containing compound with one or more hydrolyzable substituents. Organofunctional silanes are typically bifunctional molecules, depicted in some cases as $Y-\text{Si(OR)}_3$, with hydrolyzable alkoxy groups R. In the presence of water, the alkoxy groups R hydrolyze to form reactive silanol ($\text{Si}-\text{OH}$) groups, as shown in FIG. 2, with the loss of alcohol ($\text{R}-\text{OH}$). The choice of alkoxy groups affects the rate and extent of the hydrolysis reaction.

The reaction of the silanol groups and the nature of Y determine how the silane functions in a composition. Y can be organic or inorganic, hydrophobic or hydrophilic, ionic, cationic, zwitterionic, or nonionic. In some cases, Y is halogenated (for instance, chlorinated or fluorinated). Y can act as a surface modifier in a coating of a substrate such as a particle (for instance, a pigment), colloid (for instance, latex), etc.

If Y is a nonreactive group, such as an alkyl group, the organofunctional silane is generally referred to as a nonreactive silane. If Y is a reactive organic group, such as an alkoxy group, the organofunctional silane is generally referred to as a reactive silane. In some cases, Y is a reactive organic group that binds to reactive groups of a polymer, and the organofunctional silane behaves as a co-monomer in a polymerization reaction.

Organofunctional silanes suitable for PMHNC compositions resulting in the formation of inorganic polymeric vehicle systems include, but are not limited to, alkoxysilanes such as tetramethoxysilane and tetraethoxysilane, dipodal silanes such as bis(trimethoxysilylpropyl)-amine, bis(triethoxysilyl)methane, silsesquioxanes, siloxane, disiloxane, polydimethylsiloxanes, disilylmethylene, disilylethylene, silphenylene, metal silanolates, silazanes, $(\text{RO})_3\text{Si}-\text{CH}_2\text{CH}_2\text{CH}_2\text{X}$ where X is $-\text{Cl}$, $\text{C}\equiv\text{N}$, $-\text{NH}_2$, $-\text{SH}$, hybrid acetate-alkene, epoxide, or any combination thereof. Other suitable silanes can have particular functionality, including substituents such as allyl, alkynl, phenyl, hydroxyl, phenoxy, and acetoxy groups, cyclic trimers, tetramers and pentamers, halogens, ketones, azides, and isocyanates. Some organofunctional silanes, such as amino-functional silanes, are self-catalyzing, while other organofunctional silanes require a small amount of acid to initiate hydrolysis. An organofunctional silane can be chosen based on properties such as desirable reaction kinetics. For example, methoxysilanes are known to hydrolyze more quickly than ethoxysilanes.

Bis(trimethoxysilylpropyl)amine, shown below, is an example of an organofunctional silane (amine difunctional dipodal silane) with non-polar alkyl segments. Condensation of bis(trimethoxysilylpropyl)amine with the polar metal hydroxide colloidal suspension in step 110 yields a film-forming molecular hybrid inorganic vehicle system with non-polar segments, capable of improving dispersion of additives, such as pigments, in an aqueous composition.

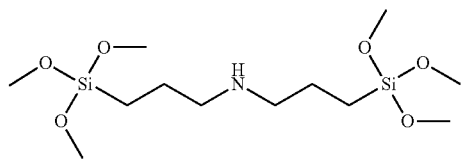

1,2-bis(trimethoxysilyl)decane, shown below, is another example of a reactive organofunctional silane with a non-polar segment. Condensation of 1,2-bis(trimethoxysilyl)-decane with the polar metal hydroxide colloidal suspension in step 110 component also yields a film-forming molecular hybrid inorganic vehicle system with non-polar segments, capable of improving dispersion of additives, such as pigments, in an aqueous composition.

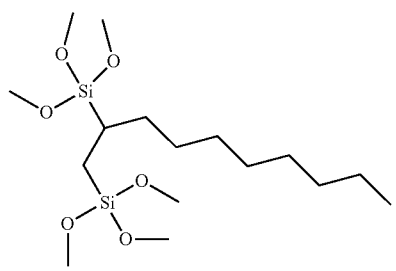 [SMILES: CCCCCCCCC(C[Si](OC)(OC)OC)[Si](OC)(OC)OC]

In some implementations, nonreactive organofunctional silanes that impart dispersibility in a variety of resins and solvents are used to provide steric stabilization and wetting properties to PMHNC compositions. Polar, non-ionic water-soluble wetting agents (neutral pH) with a chemically bonded ethylene glycol functionality are particularly suitable. These ethylene glycol functional silanes allow tailoring of surface energy to substrate surfaces within a wide pH range. Since these ethylene glycol functional silanes are hydrophilic but nonreactive, their addition promotes even application of compositions as well as substantially homogeneous dispersion of particles, such as nanoparticle composites, in aqueous compositions. The hydrophilic surface of most mineral fillers and pigments can be made hydrophobic to be more compatible with hydrophobic organic resins. The hydrophobation that occurs when the PMHNC composite alkylsilane binds to the filler particle surfaces allows for improved dispersion of the filler particles into the resin, as well as improved mechanical strength of the composition. Ethylene glycol functional silanes and/or other nonreactive organofunctional silanes can be added under boiling and/or pressure greater than atmospheric pressure to a PMHNC composition, along with an organofunctional silane, to improve particle dispersibility and enhance mechanical performance of a composition.

Organofunctional silanes are effective adhesion promoters when the substrate possesses chemically active sites on the surface, such as hydroxyl or oxide groups. PMHNC vehicle systems can be formulated to further enhance adhesion to substrates (including particulate substrates) with chemically active sites including, but not limited to, glasses, metals, and metal alloys.

Metal substrates can include aluminum, antimony, arsenic, beryllium, bismuth, cadmium, calcium, cerium, chromium, cobalt, copper, dysprosium, erbium, europium, gallium, gadolinium, germanium, gold, holmium, indium, iridium, iron, lanthanum, lithium, lutetium, magnesium, manganese, molybdenum, neodymium, nickel, niobium, palladium, platinum, praseodymium, rhenium, rhodium, ruthenium, samarium, scandium, selenium, silicon, tantalum, tellurium, terbium, thorium, thulium, tin, titanium, tungsten, ytterbium, yttrium, and zinc.

Metal alloy substrates can include any combination of metals, including scandium-aluminum, yttrium-aluminum, beryllium-copper, calcium-magnesium, calcium-aluminum, calcium-silicon, chromium-silicon, samarium-cobalt, scandium-aluminum, titanium-nickel, alloys of aluminum (including one or more of lithium, copper, silicon, magnesium, palladium, manganese, etc.), alloys of bismuth (including one or more of lead, tin, cadmium, etc.), alloys of cobalt (including one or more of chromium, tungsten, carbon, etc.), alloys of copper (including one or more of beryllium, silver, zinc, tin, aluminum, nickel, gold, silver, iron, zinc, tin, manganese, lead, etc.), alloys of gold (including one or more of copper, silver, etc.), alloys of gallium including gallinstan, alloys of indium (including one or more of bismuth, tin, etc.), alloys of iron (such as steel, carbon steel, stainless steel, surgical stainless steel, and/or including one or more of carbon, chromium, nickel, molybdenum, silicon, tungsten, manganese, cobalt, nickel, cobalt, ferroboron, ferrochrome, ferromanganese, ferromolybdenum, ferronickel, ferrophosphorus, ferrotitanium, ferrovanadium, ferrosilicon, ferrotungsten, etc.), alloys including lead, copper, tin, and (optionally) antimony, alloys including magnesium, aluminum, and (optionally) zinc, alloys of mercury-amalgam, alloys of nickel (including one or more of copper, zinc, chromium, molybdenum, iron, nickel, manganese, silicon, magnesium, silicon, bronze, copper, etc.), titanium-shape memory alloy, alloys of silver (including one or more of copper, gold, etc.), alloys of tin (including one or more of copper, antimony, lead, etc.), alloys of zirconium such as zircaloy, and alloys of uranium or depleted uranium with other metals such as titanium or molybdenum.

Polymeric substrates can include thermoplastics such as acrylonitrile-butadiene-styrene (ABS), acetals or polyoxymethylenes (POM, DELRIN®), acrylate-styrene-acrylonitrile (ASA), cellulosic polymer, cyclic olefin copolymer (COC), acrylics, (poly)acrylics, polymethyl-methacrylate (PMMA), polylactic acid (PLA), butyls or polyisobutylenes (polybutenes), ethylene copolymers (polyethylene acrylate acid (EAA), polyethylene methyl acrylate (EMAC), polyethylene ethyl acrylate (EEA), polyethylene vinyl acetate (EVA), polyethylene butyl acrylate (EBAC), polyethylene vinyl acetate (EVA or EVAC), polyethylene vinyl alcohol (EVAL or EVOH), polyethylene propylene terpolymer (EPM), polyethylene (PE, functionalized PE, high density PE (HDPE), low density PE (LDPE), linear low density PE (LLDPE), medium density (MDPE), fluoropolymers such as polytetrafluoroethylenes (PTFE) or polyvinylidene fluorides (PVDF), ionomers, liquid crystal polymers (LCP), ketones, polyaryletherketones, or polyetheretherketones (PEEK), polyketone, polyurethane (PUR), polyether sulfone (PES), polyethylenes, polyamides (PA, PAII, P12, PA4,6, PA6, PA6,6, PA6-10, semi-aromatic PA), polyamidimide (PAI), polycarbonates, thermoplastic polyesters or terphthalates (PET, PBT, PETG), polyethylenes (PEN, PTT), thermoplastic elastomers (TPE, TPE-E, TPE-S), methacrylate butadiene styrene copolymer (MBS), polyether block amides (PEBA), copolyester elastomers (COPE), thermoplastic olefins (TPE-O) styrene-butadiene-styrene (SBS), styrene-ethylene-butadiene-styrene (SEBS), thermoplastic urethane (TPE-U), thermoplastic vulcanite (TPV), polyetherimides (PEI), polyimides, polyolefins, polyphenylene oxides (PPO), polyphenylene sulfides (PPS), polypropylenes (PP), polysulphones, polyphthalamides (aramids), polyvinylidene chloride (PVDC), styrene or polystyrene, expanded polystyrene (EPS), general purpose crystal (GPPS), high impact polystyrene (HIPS), styrene acrylonitrile copolymers (SAN, ASA, AES), styrene butadiene rubber (SBR), styrene maleic anhydride (SMA), vinyl or polyvinyl chlorides (PVC), polysulfone (PSU), polylactides (PLA), and ethylene-vinyl acetates.

Other substrates include thermoset resins such as diallyl phthalate (DAP), epoxy, fluoropolymers, furan, melamine, phenolic, polybutadiene, polyester, alkyd, vinyl ester, polyimide, polyurea, polyisocyanate, polyurethane, silicone, thermoset elastomers (isoprene), resorcinol or resorcin, vulcanized fiber, and specialty resins, such as thermosets, epoxy resin (EP), melamine formaldehyde resin (MF), phenolic/phenol formaldehyde resin (P/PF), urea formaldehyde resin (UF), unsaturated polyester (UPR), and (UV) curable (meth-)acrylate.

Still other substrates include textiles, building materials such as concrete, ceramics, pigments (organic and inorganic), fillers, fiber materials, electronics, carbon, graphite, inorganic materials, organic materials, wood, paper, waste, skin, hair, and in particular, substrates and surfaces such as surgical steel, stainless steel, untreated steel, medical devices, fiberglass, cement, and fiber optics.

Addition of organofunctional silanes in step 104, before neutralization in step 106, allows incorporation of siloxy groups at a molecular level into the vehicle system, resulting in a siloxy-peroxy hybrid (mixed metal oxide) film former. "Siloxy" is used herein to refer to any compound including —Si—R—, where R is an aliphatic or aromatic group that may include heteroatoms such as oxygen, nitrogen, sulfur, etc. In some cases, the acid sol formed in steps 102 and 104 is heated or boiled (e.g., refluxed) in step 105 prior to neutralization in step 106. The pH of the mixture is less than 1, or substantially less than 1. This additional heating step increases the solubility of components in the mixture (e.g., organometallics, metal chlorides, silanes), yielding a more homogeneous solution with smaller particles, thus promoting more effective and homogeneous neutralization. The resulting hybrid siloxy-peroxy hybrid metal oxide film formers and PMHNCs demonstrate desirable properties such as, for example, increased photocatalytic efficacy, enhanced hydrophobic characteristics, more robust anti-corrosion capabilities, etc.

In step 106 of FIG. 1, a strong base, such as $NH_4OH$ or $NaOH$, is added to the mixture to form a metal hydroxide colloidal suspension. The base substantially neutralizes the aqueous mixture. Slow addition of the base and agitation of the mixture allow components of the mixture to remain suspended during, as well as after, the neutralization process. The pH after neutralization may be at least 7, or at least 8. The supernatant can be discarded.

In step 108, the amorphous metal hydroxide mixture is washed (for example, by various forms of decantation or filtration) to remove ions, such as chloride and other ions, from the mixture. Washing can include adding distilled or deionized water (DIW) to the mixture, agitating the mixture, allowing the mixture to stand, and decanting. Washing is repeated until ions are substantially undetectable in the supernatant. Testing for chloride ions may be achieved, for example, by using silver nitrate to measure levels of chloride ions in the supernatant or by using a chloride ion probe. In some implementations, washing can be repeated until the concentration of unwanted ions in the supernatant is less than about 50 parts per million (ppm). In some cases, the mixture can be subjected to centrifugal dehydration. After sufficient removal of ions, an amorphous metal hydroxide can be collected through filtration or other suitable means. The final supernatant is slightly to moderately basic (for example, having a pH of about 8-10).

In step 110, the amorphous metal hydroxide is dispersed in water to form a colloidal suspension. The water can be deionized or distilled. The amorphous metal hydroxide colloidal suspension can be slightly basic to moderately basic (for example, having a pH of about 8-10). In step 110, or in one or more later steps, water added is added in an amount needed to form a composition of a desired density. The density of the composition can be adjusted depending on the surface or substrate to which the solution is to be applied. For example, for porous or absorbent surfaces or substrates such as concrete, the density of the mixture can be relatively high, and for non-porous or non-absorbent surfaces or substrates such as glass, the density of the mixture can be relatively low. The thickness of the applied film increases with the density of the mixture.

In optional step 112, one or more organofunctional silanes, organometallics, wetting agents, and/or other reactive or inert components can be added to the aqueous metal hydroxide colloidal suspension. Suitable organofunctional silanes and organometallics were described above as optional additions in step 104.

One or more wetting agents can be added in optional step 112 to improve hydrophobicity or wettability of the composition on some substrates, such that a thinner film of the composition can be applied to a substrate. Thinner films have advantageously reduced yellow appearance, reduced moiré patterns, and reduced cure times. Suitable wetting agents include, but are not limited to, polyethylene oxide silane, isopropyl alcohol, polar (hydrophilic) nonionic ethylene glycol functional silanes, non-polar (hydrophobic) PMHNC compositions created from condensation of 1,2-bis(trimethoxysilyl)decane with polar metal hydroxide as described above, etc.

The amount of wetting agent added to the mixture can be adjusted depending on other additives in the composition, the type of substrate or surface to which the composition will be applied, etc. In some embodiments, compositions intended for highly water absorbent substrates or surfaces, such as concrete, do not require the addition of a wetting agent. In other embodiments, as much as 0.03 vol % of a wetting agent can be added to a composition intended for low surface tension or highly water repellant substrates or surfaces, such as glass, polished metals, or certain silicon wafers.

Other components that can be added in optional step 112 to impart selected physical and chemical characteristics to a composition include reactive and/or inert (substantially unreactive) organic and/or inorganic compounds. Inorganic compounds added in optional step 112 can include, for example, metal oxides, such as oxides of zirconium, zinc, yttrium, tungsten, titanium, tellurium, tantalum, tin, silver, silicon, scandium, samarium, praseodymium, niobium, nickel, neodymium, molybdenum, iron, manganese, magnesium, lutetium, lithium, lanthanum, indium, holmium, hafnium, germanium, gallium, gadolinium, europium, terbium, dysprosium, copper, cobalt, chromium, cesium, cerium, boron, aluminum, bismuth, antimony, ruthenium, beryllium, cadmium, calcium, indium, etc., and titanates, such as titanates of strontium, lead, barium, etc.

Organic compounds added in optional step 112 can include monomers such as methylmethacrylate, pentaerythritol, TMP, TME, diacids, carboxylic acids, olefins, dienes, acetylenes, styrenes, acrylic acids, ring monomers (such as cyclic ethers, lactones, lactams, cyclic amines, cyclic sulfides, cyclic carbonates, cyclic acid anhydrides, cyclic iminoethers, amino acid N-carboxy anhydrides, cyclic imides, phosphorus containing cyclic compounds, silicon containing compounds, cyclic olefins), and any combination thereof. As with the organometallic compounds, the additives can bond with the PMHS species (monomers, oligomers, etc.) to form oligomers dispersed in the composition. Composite PMHNC nanopowders designed to exhibit partial non-reactive, non-polar functionality and partial reactive silane and organometallic functionality can be incorporated into hydrophobic monomers. As an example, condensation of a reactive silane such as 1,2-bis(trimethoxysilyl)decane added in step 124 can provide increasing non-polar functionality to the PMHS species. Increasing the added amount of the 1,2-bis(trimethoxysilyl)decane to the PMHS will eventually exhaust the metal peroxide, thus optimizing hydrophobicity throughout the PMHNC. The PMHNC nanocomposites can be dehydrated as described herein and incorporated into the nonpolar monomers.

Other substantially nonreactive or inert additives added in optional step 112 include, for example, fillers, pigments, metals, carbon nanotubes (single-walled and/or multi-walled), nanographite platelets, silica aerogels, carbon aerogels, glass flakes, quantum dots, nanoparticles, etc. Nanoparticles can include, for example, nanoparticles of aluminum, aluminum nitride, aluminum oxide, antimony, antimony oxide, antimony tin oxide, barium titanate, beryllium, bismuth oxide, boron carbide, boron nitride, calcium carbonate, calcium chloride, calcium oxide, calcium phosphate, cobalt, cobalt oxide, copper, dysprosium, dysprosium oxide, erbium, erbium oxide, europium, europium oxide, gadolinium, gadolinium oxide, gold, hafnium oxide, holmium, indium, indium oxide, iridium, iron cobalt, iron, iron nickel, iron oxide, lanthanum, lanthanum oxide, lead oxide, lithium manganese oxide, lithium, lithium titanate, lithium vanadate, lutetium, magnesium, magnesium oxide, molybdenum, molybdenum oxide, neodymium, neodymium oxide, nickel, nickel oxide, nickel titanium, niobium, niobium oxide, palladium, platinum, praseodymium, praseodymium oxide, rhenium, ruthenium, samarium, samarium oxide, silicon carbide, silicon nanoparticles, silicon nanotubes, silicon nitride, silicon oxide, silver, strontium carbonate, strontium titanate, tantalum, tantalum oxide, terbium, terbium oxide, thulium, tin, tin oxide, titanium carbide, titanium, titanium nitride, titanium oxide, tungsten carbide, tungsten, tungsten oxide, vanadium oxide, ytterbium, yttria stabilized zirconia, yttrium, zinc oxide, zirconium, zirconium oxide, and any combination thereof.

Other particles ranging in size from nanometers to microns, such as polycrystalline, single crystal, or shaped charge microparticles and/or nanoparticles can be added in optional step 112 or coated with PMHNC compositions. These particles include antimony selenide, antimony telluride, bismuth selenide, bismuth telluride, boron carbide, silicon carbide, tungsten carbide, gallium antimonide, gallium arsenide, gallium indium antimonide, gallium indium arsenide, gallium phosphide, gallium(II) telluride, gallium(III) telluride, germanium telluride, indium antimonide, indium arsenide, indium phosphides, indium phosphide arsenide, indium selenide, indium sulfide, indium telluride, silicon arsenide, silicon phosphides, tin arsenide, tin selenide, tin telluride, zinc telluride, etc.

In some implementations, the amorphous metal hydroxide colloidal suspension composition formed in step 110 is applied directly to a surface to form a coating on the surface, as depicted by step 114. In other implementations, the amorphous metal hydroxide colloidal suspension composition formed in step 110 is dehydrated (for instance, spray dried) and collected as a powder to be used in nanopowder or nanocomposite powder form.

In step 116, a peroxide-based solution is added to the amorphous metal hydroxide colloidal suspension, lowering a pH of the composition to about 1 or below. The peroxide-based solution can include, for example, hydrogen peroxide, benzoyl peroxide, tert-butyl hydroperoxide, 3-chloroperoxybenzoic peroxide, di-tert-butyl peroxide, dicumyl peroxide, methylethyl ketone peroxide, [dioxybis(1-methylpropylidene)]bishydroperoxide, (1-methylpropylidene)bishydroperoxide, peracetic acid, and combinations thereof. The mixture is cooled and allowed to react for a period of time to form a stabilized amorphous (non-crystalline) metal peroxide colloidal suspension. The stabilized amorphous metal peroxide colloidal suspension can include metal peroxides such as $M(OOH)_x$, $M(OOH)_yOM$, $M(OOH)_yOM$, $M(OOH)_yOSi$, etc., where M can be any combination of $M^1$, $M^2$, or $M^3$, and various condensation products of these and other species, depending on the components in the composition, where x and y are determined by the oxidation state of M and the number of other substituents.

In some implementations, cooling is achieved in a sealed reaction vessel by reducing the pressure in the vessel to less than atmospheric pressure. The pressure in the vessel can be adjusted to achieve a desired temperature. In some cases, the mixture is cooled by a reduction in pressure of the system together with optional external thermal cooling of the system. The formulation of the mixture can determine the extent of vacuum needed to reduce the temperature of the system by a desired amount, or to a desired threshold.

The composition can be agitated during cooling. The level of agitation is chosen to achieve dissociation of ions, such that an amorphous metal peroxide colloidal suspension is formed without agglomeration of the particles. For example, the level of agitation can be between about 500 and about 10,000 rotations per minute (rpm) depending on the volume of the mixture. In some implementations, the level of agitation is between about 2500 and about 7000 rpm. If a wetting agent is added, for example, in step 112, the need for shaking or agitation is reduced or eliminated. The presence of a wetting agent can reduce a thickness of the coating or film and enhance film-forming characteristics.

When the reaction in step 116 is substantially complete, the resulting amorphous metal peroxide colloidal suspension is allowed to equilibrate at room temperature and pressure, as depicted in step 118. The suspension, which includes amorphous metal hydroxide $M^1(OH)_4$ and metal peroxides $M^1(OOH)_4$ and other species such as $M^1(Si-OH)$ and some condensation products of these and other species, is stable, and can be stored at room temperature for later use, dried to form a powder, vaporized to form a vapor, or applied to a surface, as depicted in step 120.

A coating formed in step 120 can be treated later as desired to change the chemistry or functionality of the coating. For example, a coating formed in step 120 can be treated later to enhance or impart catalytic, photocatalytic, anti-microbial, anti-viral, anti-fungal, anti-corrosive, anti-fouling, semi-conductive, conductive, insulative, electromagnetic, transparent, optical, emissive, flame retardant, piezoelectric properties, etc., or any combination thereof, to the coating. Treatment can include, for example, incorporating additives (such as nanoparticles) to a PMHNC composition, applying an additional PMHNC composite coating, depositing an additional layer with chemical vapor deposition (CVD) or atomic layer deposition (ALD), employing soft lithography techniques, etc.

In step 122, the amorphous metal peroxide colloidal suspension is heated to boiling at a pressure greater than atmospheric pressure for a suitable period of time. The composition can be agitated during heating. The temperature at which the suspension is heated can depend on several factors, including the components present in the mixture, the pressure inside the reaction vessel, and constraints associated with manufacturing. In an example, an amorphous metal peroxide colloidal suspension having a volume of about 2 liters can be heated to between about 45° C. to about 250° C. for about 1½ to 2 hours at a pressure of 10 to 100 pounds per square inch (psi). For larger volumes of the mixture, for example, as used in manufacturing, the pressure can be suitably higher, for example, up to 2500 psi. During the heating and pressure application step, the properties of the mixture (for instance, temperature, pH, etc.) can be monitored to ensure that a substantially homogeneous solution is being formed.

The amorphous metal peroxide/metal oxide composition formed in step 122 may have a pH of about 7. Light transmissiveness of the solution is about 92-98%; thus, it appears clear to the human eye. Moreover, the density of the solution (that is, the amount of solid dispersed in solution) can range from about 0.125% to about 2.0% or higher, depending on intended use of the composition.

Organofunctional silanes, organometallic compounds, wetting agents, and/or reactive or inert additives including nanoparticles, composite PMHNC powders and vapors etc., such as described for optional step 112 above, can be added as desired in optional step 124, before or during heating of the suspension in step 122. Organofunctional silanes, organometallic compounds, wetting agents, and/or reactive or inert additives, as present from optional steps 104, 112, and/or 124, can undergo hydrolysis and subsequent condensation with metal hydroxide present in the composition to form covalently bonded structures including, for example, $M(OOH)_xOM$, and $M(OOH)_xOM$ (where M can be $M^1$, $M^2$, $M^3$, or any combination thereof), along with $M(Si-OH)$ and oxides of $M^1$, $M^2$, and $M^3$, while substantially depleting the metal hydroxide present prior to reaction with the peroxide-based solution. In some cases, similar covalently bonded structures include reactive additives together with, or in place of, metals $M^1$, $M^2$, and/or $M^3$. These covalently bonded structures function as inorganic binders for the creation of nonporous coatings. In particular, as the composition is heated, the metal peroxide reacts with the silane to improve crosslinking, hardness, and abrasion resistant properties of the binder.

Substrates (or fillers) that are not able to covalently bond with silanes alone (such as polyolefins and polyethers) or demonstrate only a weak interaction with silanes alone (such as $CaSO_4$, $BaSO_4$, inorganic pigments, carbon black, calcium carbonate, and graphite) can be bound by silane-containing PMHNC vehicle systems. For example, a PMHNC hybrid vehicle system in step 122 has exposed, non-reacted peroxy groups available to react with additives able to undergo hydrolysis and condensation. The addition of methacryloxy silane (such as N-(3-acryloxy-2-hydroxypropyl)-3-aminopropyltriethoxysilane) in step 124 creates a peroxide metal methacrylate composite vehicle system with dual functionality such as $M(OOH)_2(OR)_2$, (where R is the methacryloxy silane, hydrolyzed and then condensed onto the PMHS monomer), and thus forms colloidal oligomers dispersed in water. Since the hybrid colloidal oligomers are dispersed in high percentages of water, such as approximately 98%, the free peroxy groups on the oligomers thus maintain steric stabilization.

Figure 3:
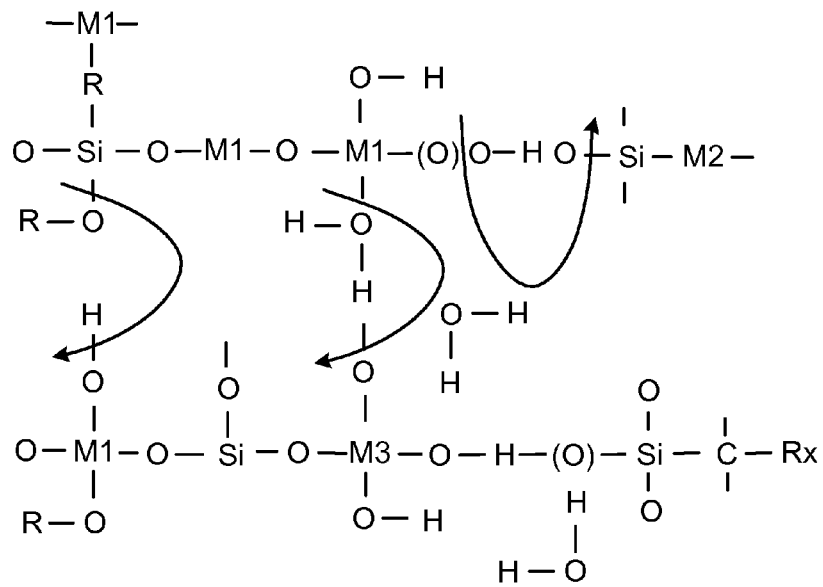
FIG. 3 depicts condensation of peroxy metal hydroxy silanes to form a crosslinked oligomer.

When the composite vehicle system is applied to a surface and the water evaporates, the peroxy groups act as a catalyst to promote polymerization. In the case of PMHS oligomer formation, the peroxide is an integral inorganic substituent of the PMHS. Thus, the peroxide is also involved in the final polymerization through hydrolysis and condensation as shown in FIG. 3. During polymerization, one leg of the double bond of the methacryl functionality breaks and links up with the middle carbon atom of another methyl methacrylate molecule to start a chain, repeating until the final hybrid polymer is formed. This type of coating enhances coupling sites on substrates that demonstrate weak interaction with silanes, and consequently improves tensile and flexural properties by up to 50% over silane treatment alone. Similarly, a PMHNC vehicle system can bind and stably disperse other additives with weak (or substantially no) silane interaction, such as carbon nanotubes, carbon black, graphite, calcium carbonate, calcium sulfate, barium sulfate, inorganic pigments, etc., in surprisingly high weight ratios.

When an organofunctional silane has been added in optional step 112 and/or step 124, silanol groups undergo condensation reactions with metal peroxides in an aqueous solution to form PMHS monomers, in which the silicon bonds directly or indirectly (with one or more intervening atoms, such as oxygen) to the metal atom in the metal peroxide.

For organometallic compounds, such as those including zinc, the reaction of, for example, $Ti(OOH)_4+Zn(OOH)_4$ in a titanium peroxide mixture forms a composite, such as a matrix of —Ti—O—Zn—O—Ti—O—Ti—O—Ti—O—Zn—O, with the formation of anatase titanium oxide crystals in a PMHNC composition. In some cases, depending on the nature of the organometallic compound and the organofunctional silane, the silane enhances dispersion of the organometallic compound in the PMHS composition, providing increased steric stabilization of dispersions such as composite nanoparticle dispersions.

In some implementations, metal alkoxides as well as organofunctional silanes are partially hydrolyzed to form reactive monomers which undergo polycondensation to form colloid-like oligomers. Addition of one or more organofunctional silanes in step 104 of FIG. 1 yields a siloxy-peroxy hybrid film former. Hydrolysis and condensation of the siloxy-peroxy hybrid film former is depicted in FIG. 3, in which $M^1$, $M^2$, and $M^3$ are transition metals and R is an aliphatic or aromatic group. In some embodiments, R includes heteroatoms such as oxygen, nitrogen, sulfur, etc. The polymerization and crosslinking shown in FIG. 3 yield a hybrid, three-dimensional matrix, and drying promotes additional crosslinking during film formation to form a siloxy-peroxy hybrid film.

The composition from step 122 can be applied to a surface, as depicted in step 126, to form a protective coating on or seal the surface. During film formation, reactive silanol groups in the PMHS monomers undergo condensation reactions with hydroxyl groups on the surface of a substrate, bonding directly or indirectly (with one or more intervening atoms, such as oxygen) with atoms on the surface of the substrate. In some cases, metal atoms in organometallic compounds incorporated in compositions bind directly or indirectly to PMHS monomers, and further bind directly or indirectly to a surface of a substrate to strengthen adhesion of the coating to the substrate. Thus, the composition described herein includes random monomeric/oligomeric networks that bind to each other and to the substrate to form an inorganic polymeric coating, layer, or film adhered to the substrate through covalent bonds between metal and substrate (directly or indirectly, with one or more intervening atoms), between silicon and substrate (directly or indirectly, with one or more intervening atoms), and between metal and silicon (directly or indirectly, with one or more intervening atoms).

An inorganic vehicle system formed in step 122 can include PMHNCs formulated for a variety of applications, including sealants for substrates including metal, wood, plastic, glass, textile, etc. The coating applied in step 126 can be used alone as a sealant to protect the substrate from the environment or, in some cases, from chemical properties of a second coating applied on top of the sealant. The coating applied in step 126 can be treated (for example, with electromagnetic radiation, heat, pressure, etc.) at a later time to alter chemical and/or physical properties of the coating.

Step 128 depicts continued boiling under pressure of the composition formed in step 122. This continued heating under a pressure greater than atmospheric pressure causes the metal peroxides to break down and promotes crystal growth of metal oxide particles, as well as additional oligomer formation and crosslinking, as depicted in FIG. 3. Thus, the ratio of metal oxide to metal peroxide in the solution increases. Depending on the metal oxide present, and other components in the composition, certain desirable properties of the composition formed in step 128 are enhanced relative to the same properties of the composition formed in step 122.

Boiling at a pressure greater than atmospheric pressure in steps 122 and 128 effectively reduces the amount of time required to form the metal oxide crystals from the suspension formed in step 116 and the metal peroxide/metal oxide composition formed in step 122 relative to the amount of time required at atmospheric pressure. Furthermore, the resulting PMHNC compositions have a tighter particle size distribution and exhibit a more transparent coating than PMHNC compositions formed by boiling at atmospheric pressure.

Temperature and pressure inside the reaction vessel in step 128 can be adjusted depending on the quantity of solution and the components in the solution. In an example, 1-5 liters of amorphous titanium peroxide/titanium oxide composition can be heated to between about 45° C. and about 250° C. under 10-100 psi of pressure for about 3 hours until the peroxides are substantially depleted and metal oxide nanocrystals are the dominant metal species. The transparent metal oxide composition can be applied by, for example, coating, spraying, drying, ALD, soft lithography (including microcontact printing (μCP), replica molding (REM), microtransfer molding (μTM), micromolding capillaries (MIMIC), solvent assisted micromolding (SAMIM), self assembled monolayers (SAM)), or other method, to any suitable surface.

For a density of about 1.2-1.5 wt % metal oxide, the composition formed in step 128 can have a light transmissiveness of about 87-93%, such that the solution appears clear to the human eye. In some implementations, the density of the metal oxide solution (that is, the amount of solid dispersed in solution) can be anywhere between 0.5 to about 2.0 wt %, depending on the desired use of the composition. The composition is a homogeneous dispersion of stabilized metal oxide nanoparticles less than about 10 nm or less than about 5 nm in diameter (for instance, about 0.3 nm to about 7 nm in diameter, or about 2 nm to about 5 nm in diameter), with enhanced film-forming/and or surface treatment capabilities determined by the silanes, organometallic compounds, and other components added in steps 104, 112, and/or 124.

One or more organofunctional silanes may also be added in step 112 and/or step 124 during the process depicted in FIG. 1. In some implementations, a first organofunctional silane is mixed with aqueous amorphous metal hydroxide in step 112. After stabilization of the resulting metal peroxide colloidal suspension, a second organofunctional silane is added in step 124 before or during boiling of the amorphous metal peroxide mixture under increased pressure. The second organofunctional silane can be the same as or different than the first organofunctional silane.

Zeta potentials of compositions depicted in FIG. 1 provide an indication of stability of these compositions. Particles with a high zeta potential of the same charge sign, either positive or negative, will repel each other. Conventionally, a high zeta potential is considered to be ≤−30 mV or ≥+30 mV. For molecules and particles that are small enough, and of low enough density to remain in suspension, a high zeta potential indicates stability, i.e., the solution or dispersion does not tend to aggregate. Mean zeta potentials of compositions described herein range from about −25 mV to about −50 mV, for example, about −30 mV or about −40 mV.

Compositions formed in steps 122 and 128 can be applied as described above to any suitable surface and allowed to dry under ambient conditions or in the presence of heat to form a coating on the surface, as depicted in steps 126 and 130. A coating can be, for instance, of monolayer thickness on the order of nanometers. In some implementations, a thickness of the coating is about 2-10 nm, about 3-8 nm, or about 4-6 nm. In other applications, a coating can have a thickness of about 10 nm to about 1 µm. For instance, a coating can have a thickness of about 10 nm to about 800 nm, about 100 nm to about 600 nm, or about 200 nm to about 500 nm. These coatings are continuous, covalently bonded, cross-linked, cured polymeric films, with no visible presence of agglomerated, non-continuous particles. In some implementations, a viscosity of a composition formed in steps 122 and 128 is adjusted to form a thicker layer or coating, for instance, on the order of microns or thicker. Repeated application of one or more compositions can result in a coating of a desired thickness and with a desired number of layers with the same or different functionality.

Compositions can be vaporized in steps 126 and/or 130 to allow vapor deposition, such as ALD, CVD, etc. to form a coating or thin film of a desired thickness. Sequential deposition of precursors of the same or different PMHNC formulations or treatments of the films in ALD, allows atomic layer control of film growth, resulting in conformal, defect-free monolayers chemically bonded to the substrate, with a thickness ranging, in some cases, from about 1 nm to about 500 nm. ALD is suitable for forming a variety of thin films, including conductors, insulators, etc. on patterned or non-patterned, porous or non-porous substrates. Composition and thickness of a coating can be selected to achieve suitable values for properties such as dielectric constant, conductivity, refractive index, transparency, reactivity, etc. In particular, pure high dielectric constant coatings essentially free of carbon (organic) contamination or silicon dioxide contamination can be achieved with the compositions described herein. The small particle sizes in the composition prepared in step 128 make these compositions particularly suitable for vapor depostion processes.

In some implementations, PMHNC compositions of 0.005% to 10% stabilized solids dispersed in water can be used to form nanocomposite powder particulates less than about 100 nm in diameter. These nanopowders or nanocomposite powders can be added to a PMHNC composition (for example, in steps 112 and/or 124) or other dispersion to improve mechanical, physical, and/or chemical properties of, for example, thermosets, thermoplastic extrusions, organic pigment dispersions, etc. PMHNC composite powders can be bonded to particulate substrates that are not readily dispersed into the PMHNC vehicle systems, or to particles not readily dispersed into, for example, thermoset or thermoplastic systems.

Figure 4:
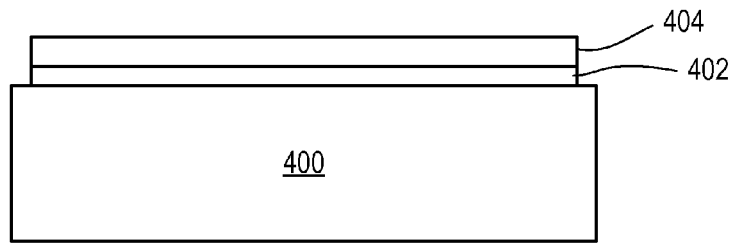
FIG. 4 depicts a first coating and a second coating on a substrate.

In some implementations, as depicted in FIG. 4, more than one coating is applied to a substrate. A first composition can be applied to a substrate 400 and allowed to dry to form a first coating 402 on the substrate. A second composition can then be applied to the first coating 402 and allowed to dry to form a second coating 404 adhered to the first coating 402. The second composition can be the same as or different than the first composition. The thickness of the first coating 402 can be approximately the same as, or different than, the thickness of the second coating 404.

Figure 5:
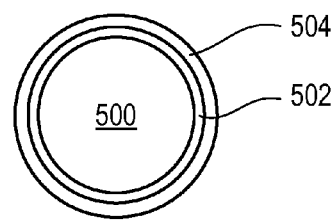
FIG. 5 depicts a first coating and a second coating on a particle.

Similarly, as depicted in FIG. 5, a first composition can be applied to a particle 500 or plurality of particles and allowed to dry to form a first coating 502 on the particle. The particle can be, for instance, a microparticle. A second composition can then be applied to the first coating 502 and allowed to dry to form a second coating 504 adhered to the first coating 502. The second composition can be the same as or different than the first composition. The thickness of the first coating 502 can be approximately the same as, or different than, the thickness of the second coating 504.

In some embodiments, a coated substrate is treated further to alter properties of the coating. Treatment of a coated substrate to alter the properties of the substrate is depicted by step 132 in FIG. 1. In some implementations, coatings formed in steps 114, 120, and/or 126 can be treated after formation of the coatings in addition to, or independently of, treatment of a coated substrate formed in step 132.

Organometallics added in steps 104, 112, and/or 124 impart specific, desirable properties to PMHNC compositions. Some non-limiting examples are described below.

Zirconium 2,4-pentanedionate is useful in the formation of high dielectric constant layers of metal oxides (for example, by ALD) containing Group 4 metals, including hafnium oxide. Zirconium oxides resulting from incorporation of zirconium 2,4-pentanedionate in PMHNC compositions impart hardness and scratch resistance to PMHNC coatings.

Zinc 2,4-pentanedionate hydrate and zinc methoxyoxide, when incorporated in $TiO_2$ PMHNC compositions, form Ti/Zn composite films with improved photocatalytic properties relative to photocatalytic properties of Ti films. These compounds can be used in the formation of transparent, conductive ZnO—$In_2O_3$ films and employed in sol-gel production of lead zirconate titanate films, sol-gel coating of alumina powders in composites, and preparation of clear monolithic poly(tetramethylene oxide) ceramers. These compounds can also be used as catalysts for simultaneous polymerization and esterification and as components in high refractive index, abrasion-resistant, and corrosion-resistant coatings. The resulting zinc oxide is a refractory material.

Yttrium 2,4-pentanedionate can be added to a PMHNC vehicle system to facilitate preparation of nanocomposite thin films including yttrium oxide mixed with other oxide components. In some cases, yttrium oxides impart superconductor-like properties to coatings formed from compositions including yttrium.

Tungsten(V) ethoxide and/or tungsten(VI) ethoxide can be added to PMHNC compositions to form tungsten nanoparticles and composites useful in electronic and light-emitting applications. Tungsten nanoparticles and composites can help achieve a thermal coefficient of expansion similar to compositions including silicon and other metals used in microelectronics. Nanomaterial inks and pastes including tungsten can be useful in preparing improved DRAM chips, other silicon devices, and liquid crystal display products.

Titanium ethoxide can be incorporated into PMHNC compositions to enhance photocatalytic properties, and serve as a high-k dielectric gate material for $SiO_2$ replacement. When added in step 112 of the process depicted in FIG. 1, titanium ethoxide increases the concentration of $TiO_2$ into the crystal lattice during film formation.

Titanium dioxide plays a complex role in durability in a variety of coating compositions, such as paint. $TiO_2$ is a photocatalyst that absorbs ultraviolet light, thereby protecting other components in a coating composition that break down under exposure to ultraviolet light. Desirable coating compositions enhance binder protection and reduce photocatalytic activity. PMHNC compositions with titanium are capable of improving pigment dispersion loadings, especially for organic pigments such as phthalocyanine blue in waterborne dispersions. Copper phthalocyanine is non-polar, like other organic pigments that exhibit a resonance structure with amine functionality (e.g., perylene, quinacridone, etc.). By stabilizing expensive organic pigment dispersions, lower loadings can be achieved, along with an improvement in chromaticity (color richness or intensity) at a significantly lower cost.

Tantalum(V) ethoxide can be added to a PMHNC composition to be used in ALD formation of high-k dielectric layers of metal oxides containing Group 4 metals, including hafnium oxide, as a gate material.

Tin(II) methoxide is useful in preparation of nano-particulate tin-containing PMHNC compositions. The tin oxide in the resulting coating provides fire-retardant and catalytic properties, and is also useful in ion exchange systems and electroconductive powders and films.

Silver(I) 2,4-pentanedionate, added in steps 112 and/or 124 of the process depicted in FIG. 1, provides antiseptic properties and enhances photocatalytic characteristics of coatings formed with PMHNC vehicle systems. Films formed with a silver(I) 2,4-pentanedionate component are transparent and, in some cases, conductive. Similarly, gold, platinum, and palladium organics can also be incorporated to provide conductive properties as needed, for example, in the case of thin film electrodes, catalyst supports, etc. Platinum 2,4-pentanedionate can be incorporated in a composition for a transparent electrode for use in, for example, a dye-sensitized solar cell. Platinum 2,4-pentanedionate can also be added to form a composite Ti/Si with bis silane as a mesoporous nanocoating for a catalytic converter.

Samarium 2,4-pentanedionate can be used in PMHNC compositions to form thin films including samarium oxide. Samarium oxide facilitates dehydration and dehydrogenation of ethanol. A nano-layer PMHNC coating with samarium oxide, incorporated over a microporous glass filter, provides increased surface area for reaction as ethanol passes through the filter.

Praseodymium 2,4-pentanedionate can be incorporated into a PMHNC composition to form a titanate nanofilm composite for electronic devices, with a layer succession of metal-insulator-metal or metal-insulator-semiconductor used as memory cells in memory devices such as DRAMs (dynamic random access memory) or as passive components in high-frequency applications.

Nickel(II) 2,4-pentanedionate can be added to a PMHNC composition to provide properties such as, for example, corrosion inhibition and catalytic activity. The resulting film can act as a catalyst for conjugate addition of alkynyl aluminum to enones, coupling of Grignard reagents to form biaryls, Grignard additions to silyl enol ethers to form alkenes, and coupling of dialkylzincs with alkyl iodides. The resulting film can also provide a thermochromic effect in non-coordinating solvents and act as a UV stabilizer for polyphenylene sulfide.

Addition of neodymium (III) 2,4-pentanedionate to a PMHNC composition forms ferroelectric titanates in a PMHNC film. When added to a PMHNC composition, molybdenum(V) ethoxide yields molybdenum oxides in the resulting films, which are useful in electrochemical devices and displays.

The structure of ordered porous manganese-based octahedral molecular sieves (OMS) is governed by the type of aggregation (for instance, corner-sharing, edge-sharing, or face-sharing) of the $MnO_6$ octahedra. The ability of manganese to adopt multiple oxidation states and of the $MnO_6$ octahedra to aggregate in different arrangements allows formation of a large variety of OMS structures. Addition of manganese(II) 2,4-pentanedionate to PMHNC compositions can promote incorporation of manganese oxide and $MnO_6$ octahedra into films that bond to substrates under ambient conditions. In some cases, PMHNC films containing manganese oxide can be used as ion intercalation hosts in lithium ion batteries.

Addition of magnesium 2,4-pentanedionate to a PMHNC composition results in a film with catalytic properties. A PMHNC film with magnesium oxide can be used as a catalyst for polymerization of olefins and/or thickening reactions of polyesters.

Incorporation of magnesium ethoxide into step 104, 112, and/or 124 of the process depicted in FIG. 1 results in composite formation with $TiO_2$ to create spinels that can be used for high refractory thin film crucible linings and gas permeable inorganic membranes.

Addition of magnesium methoxide to a PMHNC composition results in the formation of films containing magnesium oxide (magnesia). Magnesia has a high coefficient of thermal expansion that makes this oxide especially suitable for a porous structure for use as a support for an inorganic membrane with a comparable coefficient of thermal expansion. Magnesia is a substantially pure phase refractory ceramic with a high coefficient of thermal expansion, and therefore imparts unique characteristics to a PMHNC coating. PMHNC coatings with magnesium oxide can be used, for example, in magnetic core windings and in other applications including production of fluorophlogopite and applications in which the dielectric constant of magnesium oxide and optical properties of sol-gel derived therefrom are desirable. In some cases, a PMHNC coating with magnesium oxide can be used to deacidify paper.

Addition of lithium 2,4-pentanedionate in the process depicted in FIG. 1 yields nano lithium composite films and powders. The resulting small particle size and narrow size distribution are advantageous for use as electrodes for lithium ion batteries, allowing the batteries to retain their charging capacity at high charging and discharging rates.

When the process depicted in FIG. 1 includes lanthanum 2,4-pentanedionate, the resulting PMHNC film includes lanthanum oxide and is suitable as a high-k dielectric gate material. These films can be intermediates for ferroelectrics and sol-gel derived superconductors.

In the presence of selected yttrium compounds, lanthanum methoxyethoxide forms $LaYO_3$ in PMHNC films. $LaYO_3$ can be used as an exhaust catalyst or, with other components, in the formation of an oxidation resistant coating.

Addition of lanthanum isopropoxide to a PMHNC composition results in low leakage dielectric films. A coating including lanthanum oxide as a dielectric layer has a relatively high dielectric constant, a relatively high conduction band offset, and a high crystallization temperature.

Addition of indium 2,4-pentanedionate and/or indium methoxyethoxide in the process depicted in FIG. 1 results in the formation of clear, electrically conductive films that can be used in field effect transistors.

PMHNC compositions including hafnium 2,4-pentanedionate and/or hafnium ethoxide yield refractory coatings and films with high-k dielectric layers including hafnium oxide.

When added to PMHNC compositions, gallium(III) 2,4-pentandionate and gallium(III) ethoxide yield films including gallium oxide nanocrystals. Films with gallium oxide nanocrystals are useful for opto-electronic devices and gas-sensing and catalytic applications. Cohydrolysis of gallium(III) ethoxide with tellurium alkoxides in a PMHNC vehicle system yields films that are useful in heat-mode erasable optical memory.

PMHNC compositions made with gadolinium 2,4-pentanedionate trihydrate yields films suitable for controlling or containing radioactive contamination by providing a neutron absorbing material to a radioactive contamination site.

Iron (III) 2,4-pentanedionate and iron (III) ethoxide, when added in the process depicted in FIG. 1, act as intermediates for sol-gel formation of ferrites. Coatings with the resulting iron oxides yields catalytic coatings and coatings with magnetic properties. Iron (III) ethoxide reacts with other components to form iron oxide and other products. For example, iron (III) ethoxide reacts with platinum, to yield FePt nanoparticles. In some cases, films including iron oxides are useful as intercalation hosts in lithium ion batteries.

In some embodiments, addition of europium 2,4-pentanedionate to a PMHNC composition yields coatings with fluorescent properties.

Erbium oxide provides a pink coloration to films produced from vehicle systems made with the addition of erbium 2,4-pentanedionate.

PMHNC compositions with dysprosium oxide derived from dysprosium 2,4-pentanedionate are suitable for ALD.

Addition of copper(II) 2,4-pentanedionate and copper(II) ethoxide to PMHNC compositions yields films useful in electrochemical and superconducting applications.

When incorporated into PMHNC compositions, cobalt(III) 2,4-pentanedionate serves as a catalyst in a range of polymerization reactions that facilitate film formation. This organometallic compound also has applications in the preparation of light-sensitive photographic materials.

Nanoparticles derived from the addition of chromium(III) 2,4-pentanedionate to PMHNC compositions are incorporated into a crystalline matrix during film formation. In some cases, films with chromium oxides demonstrate catalytic properties.

Cesium 2,4-pentanedionate can be used in the preparation of PMHNC compositions to yield films useful for field emission displays. Resulting films with cesium oxide are useful as conductive layers in forming electrodes for electronic devices.

When added to PMHNC compositions, cerium 2,4-pentanedionate yields coatings with cerium oxide. Coatings with cerium oxide absorb UV radiation and can also be used as a high-k dielectric gate material.

Boron ethoxide is useful in the formation of boron oxide nanocomposites for nanofilms and nanopowders. PMHNC compositions with boron can be used as CVD precursors for boron-modified $SiO_2$ in microelectronics.

Bismuth(III) t-pentoxide can be added to PMHNC compositions to yield films with bismuth oxide. Films with bismuth oxide are characterized by x-ray opacity and radiofrequency opacity. Films with bismuth oxide can also be used in the manufacture of varistors and in the coating of microparticle plastics for extrusion.

Aluminum(III) 2,4-pentanedionate can be used in the formation of high-k dielectrics by ALD.

In some embodiments, PMHNC films with barium oxide derived from barium 2,4-pentanedionate are useful as intermediates for sol-gel derived superconductors.

Addition of beryllium 2,4-pentanedionate to a PMHNC composition, in some cases, yields high thermal conductivity ceramic coatings.

PMHNC films with cadmium oxide, derived from the addition of cadmium 2,4-pentanedionate, are transparent to infrared radiation, and exhibit light-emitting and conductive properties.

Addition of calcium 2,4-pentanedionate to PMHNC compositions facilitates coating of glass microparticles with thin films to achieve a desirable melt effect.

Incorporation of iridium oxide into PMHNC coatings through the addition of iridium(III) 2,4-pentanedionate yields films with catalytic and/or photoreducing properties.

Other suitable organometallics for addition to PMHNC compositions include, but are not limited to, lithium ethoxide, vanadium(III) pentanedionate, tin(II) 2,4-pentanedionate, palladium 2,4-pentanedionate, holmium 2,4-pentanedionate, antimony(III) ethoxide, and barium(II) methoxypropoxide.

In addition to the metal oxides formed in the process depicted in FIG. 1, a variety of metal oxides, sulfides, phosphides, arsenides, etc. can be added in steps 104, 112, and/or 124 to enhance selected properties of a PMHNC composition. Metals suitable inclusion as oxides, sulfides, phosphides, arsenides, etc. include, for example, titanium, zirconium, zinc, strontium, cadmium, calcium, indium, barium, potassium, iron, tantalum, tungsten, samarium, bismuth, nickel, copper, silicon, molybdenum, ruthenium, cerium, yttrium, vanadium, tellurium, tantalum, tin, silver, scandium, praseodymium, niobium, neodymium, manganese, magnesium, leutium, lithium, lanthanum, holmium, hafnium, germanium, gallium, gadolinium, europium, erbium, dysprosium, cobalt, chromium, cesium, boron, aluminum, antimony, lead, barium, beryllium, iridium, and the like, or any combination thereof.

The above compounds can be added to a PMHNC composition in a step in FIG. 1 or formed during the process depicted in FIG. 1. Advantages, properties, and uses of various oxides and other compounds in coatings and nanopowders formed from PMHNC compositions are described below. Macroscopic properties of these compounds are indicative of the characteristics they demonstrate on a molecular level when bound in a PMHNC coating or nanopowder.

Zirconium oxide and yttrium stabilized zirconium oxide are hard white, amorphous powders, useful in pigments, refractory materials, and ceramics. Zinc oxides are also useful in refractory materials, and demonstrate a thermal expansion less than that of alumina, magnesia, and zirconia. These oxides provide abrasion resistance and corrosion resistance to PMHNC coatings.

In PMHNC films, yttrium oxide is useful as a catalyst, a colorant, a flux, and a dye, and has fire-retardant properties.

Tungsten oxide can be added to PMHNC compositions as a pigment, an opacifying agent, and/or a catalyst. It is desirable in optical coatings, welding rod fluxes, ceramic finish coats, plastics, elastomers, coated fabrics, printing inks, roofing granules, glass, and glazes.

In PMHNC films, titanium oxide, titanium dioxide, and tantalum pentoxide provide high index, low absorption material usable for coatings in near ultraviolet to infrared regions. Dense layers or multilayers can be used. Titanium oxide/dioxide and tantalum pentoxide can be used together with silicon dioxide to form hard, scratch-resistant, adherent coatings. Films with titanium oxide/dioxide can also be used as dielectrics in film capacitors and as gate insulators in LSI circuits requiring low leakage voltage characteristics. Tantalum pentoxide also demonstrates ferroelectric properties. Tantalum oxides are useful in PMHNC compositions as opacifiers and pigments and are beneficial in applications including ceramics, capacitors, and conductive coatings.

When added to PMHNC compositions, silicon monoxide powder can provide anti-reflective and/or interference properties. In some cases, silicon monoxide powder is used with ZnS and other materials to form reflective coatings. Films with SiO can be used in electronics applications, such as thin-film capacitors, hybrid circuits, and semiconductor components, with a variety of insulating and dielectric properties determined by film thickness. Incorporated in PMHNC films, SiO adds corrosion and wear resistance, and can be used as a filler in a variety of applications. Silicon dioxide, synthetic silicon dioxide, silicate powder, silica sand, quartz sand and powder, amorphous silica, and silica aerogels can also be added to PMHNC compositions (for instance, compositions including $ZrSiO_2/TiO_2$) to form high-k films and enhance heat and thermal shock resistance. These films are also useful in electronic ceramics.

Scandium oxide can be added to PMHNC compositions to provide a yellow coloration or enhance magnetic properties.

In PMHNC compositions, nickel oxides act as corrosion inhibitors and/or oxygen donors, and can react with molybdenum compounds to form nickel molybdate. Films including nickel oxides are useful in thermistors, varistors, cermets, resistance heating elements, ceramic glazes, enamels, and pigments.

When added to PMHNC compositions, niobium oxide enhances properties related to use in ceramic capacitors, glazes, and colored glass.

Addition of micaceous iron oxide to a PMHNC composition yields coatings with durable, corrosion-resistant properties that reflect ultraviolet light. A PMHNC nanopowder with micaceous iron oxide can be dispersed in paints, primers, or other coating compositions to add increased corrosion- and weather-resistance. The horizontal layering and overlapping of the lamellar (micaceous) particles strengthens the coating compositions and acts as a barrier to the penetration of corrosive elements and ultraviolet light.

In some implementations, manganese oxide powder ($MnO_2$) is added to PMHNC compositions as a colorant or decolorizer. MnO provides ferromagnetic and catalytic properties to PMHNC coatings.

Magnetite/black iron oxide powder is a natural iron oxide magnet. When added to PMHNC compositions, the resulting coatings are useful as refractory materials, absorbent coatings, catalytic coatings, and catalyst supports. PMHNC nanopowders with iron oxide can be used in cements, fertilizers, gas-scrubbing applications, etc.

When added to PMHNC compositions, specular hematite ($Fe_2O_3$) will aid in resistance to corrosion, including rusting and oxidation, thus allowing flow of a composition through a metering valve without staining or clogging. Furthermore, $Fe_2O_3$ will add non-hygroscopic properties to a PMHNC film, and is useful in steel manufacture or as a colorant and/or coating for rubber, adhesives, plastics, concrete, and iron.

PMHNC compositions with lutetium oxide powder and/or lanthanum oxide powder exhibit desirable optical properties. Applications include X-ray image intensifying screens, phosphors, dielectric ceramics, conductive ceramics, and barium titanate capacitors.

Indium tin oxide powder is a transparent, conducting material with a variety of applications in display devices, photovoltaic devices and heat reflecting mirrors. PMHNC compositions with indium tin oxide can be used in flat panel display applications, glass manufacturing techniques, electroluminescent display applications, plasma display panel applications, electrochromic display applications, field emission display applications, and transparent coatings. PMHNC compositions with indium oxide enhance resistive elements in integrated circuits, sputtering targets, and conductive inks.

In PMHNC compositions, hafnium oxide powder adds properties desirable for refractory material and gate oxides.

In some embodiments, addition of germanium oxide powder to PMHNC compositions yields coatings for optical glass.

Gallium oxide powder can be used in PMHNC coatings as a chemical intermediate or as an enhancement for compositions or coatings used in semiconductor electronics, such as piezoelectric resonators and transducers.

Gadolinium oxide powder is used as a raw material for various fluorescent compounds, absorption material in atomic reactions, magnetic bubble material, screen-sensitivity increasing material, as well as in many other applications in the chemical, glass, and electronics industries. Similar benefits are apparent upon incorporation of gadolinium oxide powder in PMHNC coatings and nanopowders.

Addition of copper oxide powder to a PMHNC composition provides a red pigment to PMHNC films and nanopowders, and imparts anti-fouling properties.

A PMHNC with chromium dioxide powder can be used as an additive to bricks, pigments and mortars to increase the life of the these materials.

When present in PMHNC coatings and nanopowders, boric oxide powder acts as a flame retardant and corrosion inhibitor. Boron oxide powder acts as a acid catalyst or chemical intermediate in production of different boron compounds.

Boehmite alumina powder (AlO(OH)) and alumina powder ($Al_2O_3$) are used in refractories, abrasives, cement, slag adjusters, ceramics, aluminum chemicals, flame retardants, fillers, welding fluxes, adsorbents, adhesives, coatings, and detergent zeolites. Addition of boehmite alumina powder to PMHNC compositions imparts desirable properties on a nano scale to PMHNC coatings and nanopowders for similar uses.

Similarly, bismuth oxide powder is used in optical glasses, fluxes, varistor formulations, ceramic capacitor formulations, and as a replacement for lead oxide in whitewares (bone china, etc.). Addition of bismuth oxide powder to PMHNC compositions imparts desirable properties on a nano scale to PMHNC coatings and nanopowders for similar uses.

When added to PMHNC compositions, antimony tin oxide adds properties favorable for use in optics and electronics, particularly in display panels, due to antistatic properties, infrared absorbance, transparency, and conductivity.

Antimony oxide powder imparts flame retardant properties to PMHNC compositions.

Coatings from PMHNC compositions that include fused aluminum oxide powder demonstrate increased abrasion resistance. These compositions are also useful as refractory coatings.

Other oxides useful in PMHNC compositions include, but are not limited to, ruthenium oxide, beryllium oxide, cadmium oxide, calcium oxide, vanadium oxide, samarium oxide, neodymium oxide, molybdenum oxide, praseodymium oxide, ferric iron hydroxide, lithium oxide, holmium oxide, europium oxide, cerium oxide, and aluminum oxide.

Various titanites can be added to PMHNC compositions to impart desired properties to coatings and nanopowders formed from the compositions. For example, crystalline strontium titanite is a high dielectric constant material that can be incorporated into a PMHNC film for uses a dielectric gate material for $SiO_2$ replacement. PMHNC compositions with lead zirconate titanate can be useful in the field of transducers, both for loudspeakers and microphones. When added to PMHNC compositions, barium titanate enhances coatings for use with ferroelectric ceramics, single crystals, storage devices, and dielectric amplifiers.

The following non-limiting examples describe various stages of preparation of PMHNC compositions.

Hybrid metal oxides including silicon can be formed with one or more additional metal salts in other embodiments as well. For example, when a silicon halide and one or more additional metal salts are added in step 102, or step 102 and step 104, the resulting vehicle systems include hybrid metal oxides of silicon and any of $M^1$, $M^2$, or any combination thereof. Exemplary hybrid metal oxides include $[SiO_x:TiO_y]$, $[TiO_y:SiO_x]$, $[SiO_x:ZrO_z]$, $[SiO_x:ZrO_z:TiO_y]$, $[SiO_x:ZrO_z:TiO_y]$, and $[TiO_y:ZrO_z:SiO_x]$. As used herein, hybrid metal oxides are expressed as wt % ratios in descending order, with 100 wt % representing the total weight of the metal oxides in the composition to be applied to a substrate. Thus, a vehicle system that includes 19 wt % zirconium oxide, 1 wt % titanium oxide, and 80 wt % silicon oxide, is expressed as a $[SiO_x:ZrO_z:TiO_y]$ hybrid, and a system that includes 98 wt % titanium oxide and 2 wt % silicon oxide is expressed as a $[TiO_y:SiO_x]$ hybrid. $SiO_x$, $TiO_y$, and $ZrO_z$ are referred to herein as "metal oxides," and can represent various molar ratios of metal to oxygen. In some embodiments, an oxide may be a dioxide.

The characteristics of these vehicle systems allow for hybrid metal oxide coatings to be applied to a wide array of substrates at room temperature to form inorganic, polymeric thin films on the substrate. Depending on the composition of the vehicle system, hybrid metal oxide coatings may be hydrophilic or hydrophobic without further treatment following film formation. That is, once the coating is dry, additional treatment such as, for example, irradiation with UV light, is not required to achieve the desired hydrophobic/hydrophilic characteristics. As used herein, a "hydrophilic" surface has a contact angle with water of less than about 20°, less than about 10°, or less than about 5°. As used herein, a "hydrophobic" surface has a contact angle with water of at least about 90°.

In an example, an aqueous hybrid metal oxide composition with more than 50 wt % of titanium oxide (expressed herein as $[TiO_y:SiO_x]$, $[TiO_y:SiO_x:MO_z]$, $[TiO_y:MO_z:SiO_x]$, etc.), forms a hydrophilic coating that will absorb water and repel non-polar solvents such as toluene. For an aqueous hybrid metal oxide composition including greater than 50 wt % of silicon oxide (expressed herein as $[SiO_x:TiO_y]$, $[SiO_x:TiO_y:MO_z]$, $[SiO_x:TiO_y:MO_z]$, etc.), the vehicle system forms a hydrophobic coating that will repel hydrophilic polar solvents such as water.

A hydrophobic coating imparts anti-corrosive properties to a substrate, repelling water and causing water droplets to bead up on the surface of the coating rather than allowing the coating to absorb the water. Thus, a hydrophobic coating can form an anti-corrosive coating for metal substrates, while a hydrophilic coating allows water to contact the substrate and contribute to electrochemical corrosion.

Hydrophobic coatings formed from silicon-titanium hybrid metal oxide vehicle systems can include, for example, greater than 50 wt % silicon oxide and less than 50 wt % titanium oxide. Examples include $SiO_x:TiO_y$ of about 80:20, about 95:5, about 98:2, about 99:1, and about 99.99:0.01. Hydrophobic coatings formed from a hybrid metal oxide vehicle system including silicon, titanium, and zirconium can include greater than 50 wt % silicon oxide, with the sum of titanium and zirconium oxides less than 50 wt %. As an example, a ratio of $[SiO_x:ZrO_z:TiO_y]$. can be about 80:19:1 for a non-photocatalytic coating. In some cases, titanium is absent, resulting in a $[SiO_x:ZrO_z]$ vehicle system.

Hydrophilic coatings formed from titanium-silicon hybrid metal oxide vehicle systems can include, for example, greater than 50 wt % titanium oxide and less than 50 wt % silicon oxide. Examples include $TiO_y:SiO_x$ of about 80:20, about 95:5, about 98:2, about 99:1, and about 99.99:0.01. Hydrophilic coatings formed from a hybrid metal oxide vehicle system including titanium, silicon, and zirconium can include greater than 50 wt % titanium oxide, with the sum of silicon oxide and zirconium oxide less than 50 wt %. In some cases, silicon is absent, resulting in a $[TiO_y:ZrO_z]$ vehicle system.

Optimal solids content and film forming, binding, and stability properties of the vehicle systems are achieved by careful attention to factors such as chloride and ammonium ion concentration, amount of peroxide added, pH at various stages, pressurization during heating, and heating and cooling temperatures, described above with reference to FIG. 1. The resulting vehicle systems function as binders and film formers for hybrid metal oxide nanoparticles stabilized in solution. The nanoparticles are advantageously formed to have very small particle size and exhibit a high zeta potential.

In particular, the ammonium ion concentration is related to the pH of the mixtures formed during the process. Chloride ion removal to less than about 2 ppm, or less than about 1 ppm, together with an effective ammonium ion concentration, promotes formation of stable vehicle systems. The weight ratio of peroxide added to the solids of the colloidal suspension following chloride ion removal can be about 30±20%, for example about 28-33%. The pH values vary throughout the process from below 1 in step 102 of FIG. 1, up to 9 or up to 11.5 prior to chloride ion removal in step 108, and down to 4 or below following peroxide addition in step 116. In step 118, the mixture is slightly acidic, with a pH between about 5 and 7. The vehicle system resulting from step 128 is nearly neutral, ranging from about 7.0 to about 7.5 or from about 7.0 to about 10, depending upon the pH of neutralization in step 106. FIG. 1 is described below in detail for $[TiO_y:SiO_x:MO_z]$ vehicle systems in which the weight ratio of titanium oxide exceeds the sum of the weight ratios of silicon oxide and other metal oxide. $MO_z$ (e.g., $ZrO_z$) can be present or absent. For the sake of simplicity, $MO_z$ is not considered to be present in this exemplary illustration. Measured indicators such as pH, heat evolved, etc. for $[TiO_y:SiO_x]$ vehicle systems differ from the indicators for $[SiO_x:TiO_y]$ vehicle systems based upon the resulting reactions through similar processing steps.

An acidic, aqueous mixture of titanium tetrachloride and silicon tetrachloride is formed in step 102. The pH of the mixture starts out below 1 and increases steadily toward a neutral pH of about 7.5 to about 11.5, depending upon molar ratio of titanium and silicon present in solution. During neutralization with ammonium hydroxide in step 106, hydroxides of titanium and silicon float out of the colloidal suspension and readily disperse back into suspension with mild agitation. The flakes appear sparsely throughout the neutralization process. The heat released in the neutralization reaction evolves steadily as the reaction proceeds. After neutralization, the metal hydroxide mixture is an opaque white with a seaglass greenish tint.

Once neutralized, the mixture stabilizes in about 24 hours or less (e.g., about 12 hours or less, about 8 hours or less, or about 4 hours or less). The suspended particles form light, fluffy agglomerates thought to be held together by van der Waals forces. The flocculated particles settle rapidly, forming a loosely adhering mass. At this point in the process, the colloidal suspension can be packaged in a container and transported. The particles may settle out during transportation, and can be re-suspended with gentle agitation.

Steps 108-116 may be followed as described above. After the last filtration/decantation in step 108, one or more of a variety of ion exchange resins can be added to the suspension to facilitate removal of chloride ions. The chloride ions are effectively replaced by ammonium ions (e.g., including some from the ion exchange resin), raising the pH and preparing the colloidal suspension in step 110 for addition of peroxide in step 116. The suspension is cooled to a temperature below about 10° C. prior to peroxide addition. During peroxide addition, cooling is used to control and stabilize the rate of the exothermic reaction of metal hydroxides with peroxide to form metal peroxides. Addition of about 30±20 wt %, for example about 25-35 wt % or about 30-33 wt % peroxide, based on colloidal solids, causes a decrease in pH of the mixture to about 2 or below. Steps 118-128 may be followed to form a sterically stabilized [$TiO_y$:$SiO_x$] vehicle system.

The sterically stabilized [$TiO_y$:$SiO_x$] vehicle system can be applied to a substrate and allowed to dry under ambient conditions. Hydrolysis and condensation reactions occur during drying, resulting in formation of a hybrid metal oxide coating or film on the substrate. The condensation reactions include, for example, binding of a peroxide to a surface hydroxyl group with the elimination of water, binding of one peroxide to another peroxide, etc. The hybrid metal oxide coating is polymeric, hydrophilic, and may be photocatalytic, depending on the presence of photocatalytic species such as anatase titanium dioxide.

FIG. 1 is described below in detail for [$SiO_x$:$TiO_y$:$MO_z$] vehicle systems in which the weight percentage of silicon oxide ($SiO_x$) exceeds the weight percent of $TiO_y$ in the composition to be applied to a substrate. $MO_z$ (e.g., $ZrO_z$) can be present or absent. For the sake of simplicity, $MO_z$ is not considered to be present in this example.

An acidic, aqueous mixture of titanium tetrachloride and silicon tetrachloride is formed in step 102. A pH of the mixture is less than about 1. The amount of base required for neutralization and the shape of the titration curve are dependent upon the weight ratio of silicon oxide to titanium oxide (i.e., [$SiO_x$:$TiO_y$]). A [$SiO_x$:$TiO_y$] vehicle system, which results in a hydrophobic coating, requires less base (e.g., about ⅓ less) and results in a higher pH when neutralized than a [$TiO_x$:$SiO_y$] vehicle system, which results in a hydrophilic coating. During neutralization with ammonium hydroxide in step 106, hydroxides of titanium and silicon float out of the colloidal suspension and readily disperse back in suspension with mild agitation. The flakes appear sparsely throughout the neutralization process. Heat evolves non-linearly during neutralization, with more heat released as the pH approaches 7 than is observed for a [$TiO_x$:$SiO_y$] vehicle system. Base is added until the pH of the mixture is between about 7.0 and 8.0 (e.g., about 7.5 or about 7.65) or between about 7.0 and 11.5. The silicon hydroxide is more soluble at higher pH. Thus, a higher pH may be desirable for systems with a higher percentage of silicon. After neutralization, the metal hydroxide suspension in which the molar ratio of silicon is higher than the molar ratio of titanium is opaque and white with a translucent aqua green tint, indicating a smaller colloidal mean particle size distribution than the greenish metal hydroxide mixture in which the molar ratio of titanium is higher than the molar ratio of silicon.

Upon standing at room temperature for about 12 hours, the pH of the mixture is between about 7.0 and 8.5 (e.g., about 7.6 or about 8.2) or between about 7.0 and 11.5, and may vary from the bottom of the vessel to the top of the vessel containing the mixture. A single pH value can be obtained following sufficient agitation to form a homogeneous suspension. The suspended particles form light, fluffy agglomerates thought to be held together by van der Waals forces. The flocculated particles settle rapidly to form a loosely adhering mass. The particles can be re-suspended with gentle agitation.

Effective chloride ion removal is achieved during filtration or decantation, followed by reconstitution or re-suspension in step 108. Filtration, such as with a Nutsche filter, may allow for quantitative separation, as well as incorporation of additives such as silanes, organometallics, monomers, nanoparticles etc., in a solid, liquid, or gaseous phase to react with the gelatinous clay, while decantation is advantageously rapid. The advantages of decantation may be less apparent in the filtration of a hydrophobic metal hydroxide clay than in the filtration of a hydrophilic metal hydroxide clay, since the hydrophobic clay absorbs less water and thus can be filtered more quickly.

As the amorphous hydroxide clay becomes increasingly more dense with successive reconstitution, more agitation may be required for sufficient removal of chloride ions. Ammonium ions present in the mixture have a strong affinity for the chloride ions, and facilitate removal of chloride from the metal chlorides to allow formation of metal hydroxides. If the suspended particles are not reduced in size enough, for example, through wetting and agitation, the chloride ions may not be removed sufficiently. In some cases, aqueous ammonium ions, as well as one or more additives, fillers, etc. described herein, are added during reconstitution (e.g., to the reconstitution water) as a way of introduction to the suspension. Ammonium ions from the ion exchange resin may also enter the suspension.

After the first filtration, the majority of the amorphous metal hydroxides are retained in the clay from a filter (e.g., a multi-layer filter). The clay is a translucent, glassy, opalescent gel with a slight green tint, and the filtrate, which includes chloride and ammonium ions, is clear. The filter can be, for example, a 0.75 micron (GF/F) or 1 micron or 20 micron Whatman Grade GF/B Glass Microfiber Filter (Whatman plc, UK). Silicon hydroxide is retained in the gelatinous clay.

After a third filtration or decantation, chloride ion concentration is between about 100 and 200 ppm, and pH is between about 8.0 and 8.5, between about 8.0 and 11.5, or greater than 11.5. The gelatinous clay and the filtrate can be visually inspected to assess chloride ion removal. A clear filtrate indicates the presence of an undesirably high amount of chloride ion, while cloudiness indicates that the chloride ion is being appropriately decimated.

After a fourth filtration or decantation, which may be the final filtration or decantation, the chloride ion concentration following reconstitution is lowered to about 10 to about 100 ppm or about 10 to about 20 ppm, and a pH of the solution is between about 8.5 and about 9.5 (e.g., about 8.8), or between about 8.5 and about 11.5. In some cases, one or more additional filtrations or decantations may be required to lower the chloride ion concentration to an acceptable level. One or more of a variety of ion exchange resins can be added based upon the reconstituted clay solids from the final filtration in incremental amounts over a period of about 30-40 minutes to 2.5 hrs to achieve a chloride ion concentration of about 2 ppm or lower, and a pH of about 7.0 to about 8.0, or about 7.0 to about 11.5. As the chloride ions are removed, in contrast to the hydrophilic vehicle systems, ammonium ions are inhibited from entering the colloidal suspension. Sulfonic acid from the ion exchange resin can enter the suspension and lower the pH. Factors such as chloride ion concentration can be used to determine how much ion exchange resin is needed and how long is needed to effect substantially complete removal of the chloride ions. If chloride ions remain after the filtration and ion exchange process due to, for example, insufficient filtration and or molecular interference from contamination sources, steric stabilization required to achieve the stable vehicle system may not be achieved. Desired chemical and physical attributes such as hydrophobicity, film formation, binder capabilities, flexibility, stability, and durability can be realized when the chloride ion concentration is reduced to about 2 ppm or less, more preferably about 1 ppm or less, and the pH of the suspension is in a range from about 8.3 to about 9.3 (e.g., about 8.8 to about 9.2) or from about 8.3 to about 11.5.

Chloride ion removal must be substantial while obtaining the desired pH prior to peroxide addition to the metal hydroxide reconstituted colloidal suspension. The peroxide is added along with cooling of the colloidal mixture to below 10° C. About 30±20% (e.g., about 25-35 wt % or about 30-33 wt %) peroxide, based on colloidal solids, is added to the cooled colloidal clay suspension, causing a decrease in pH of the mixture to about 4 or below or to about 2 or below. This metal hydroxide reacts with the peroxide at a reduced temperature, effectively controlling the rate of the exothermic reaction. If the suspension is not cooled sufficiently, the particles may fall out of solution. In some cases, homolytic cleavage of the peroxide occurs. An excess of peroxide may result in an overly yellow appearance to the film. Any instability will enhance propensity for precipitation and settling out of solution. Insufficient peroxide will leave non-reacted hydroxyl groups on the metal (e.g., silicon, titanium, zirconium) in the clay and remain re-dispersed in the colloidal suspension, resulting in reduced film and binding capabilities and thus contributing to instability. Instability may also be caused by disadvantageous variations in composition that lead to precipitation of the colloidal suspension.

The reaction of metal hydroxide with peroxide may be shown as:

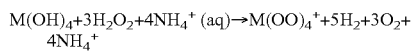

$$M(OH)_4 + 3H_2O_2 + 4NH_4^+ (aq) \rightarrow M(OO)_4^{4-} + 5H_2 + 3O_2 + 4NH_4^+$$

Figure 6:
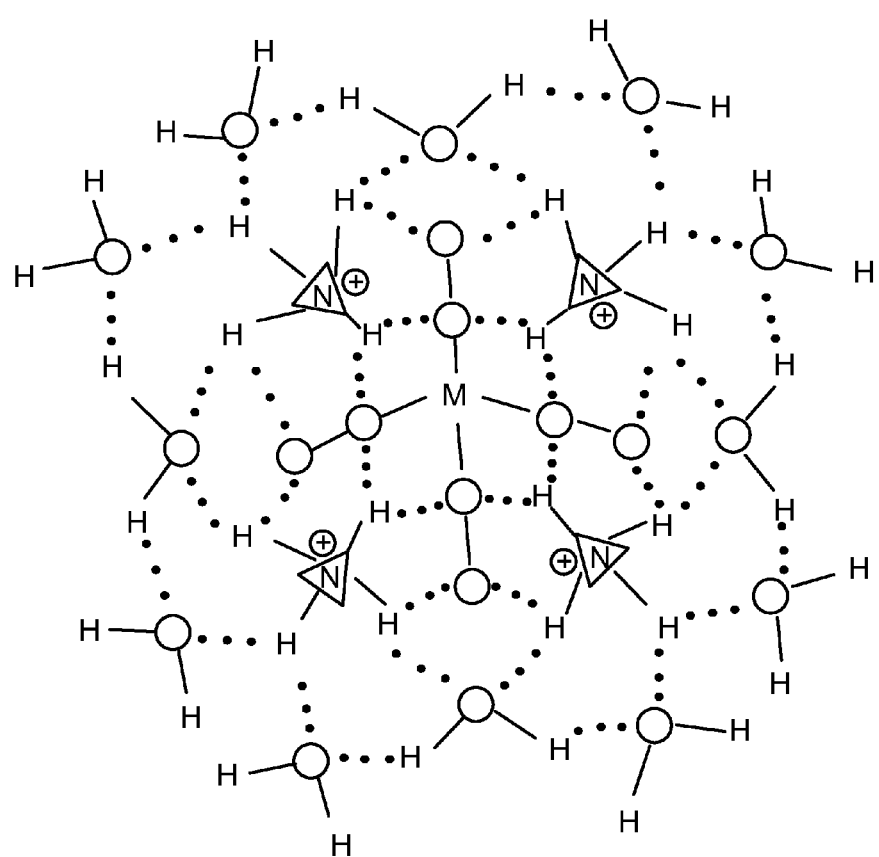
FIG. 6 depicts a model of a silicon peroxide in solution.

FIG. 6 depicts a model of silicon peroxide formed in this reaction and stabilized in solution, with ammonium ions proximate the peroxide groups. Hydrogen bonding with water in the aqueous solution is thought to stabilize the arrangement of the silicon peroxide and ammonium ions. After addition of peroxide and cooling (e.g., for about 24 hours), the mixture, with a pH between about 5 and about 6 (e.g., about 5.6), is brought to room temperature. The pH rises and stabilizes between about 6.5 and about 7.5 (e.g., between about 7.0 and about 7.3) or between about 6.5 and about 11.5. The mixture may be filtered through a GF/B (1 micron filter) into a flask. After about 50-80% of mixture has been filtered, a silaceous mesoporous nanogelatinous membrane is formed on the top of the filter. A secondary reaction occurs in the filtrate as peroxo groups are stabilized on the metal by ammonium ions, evidenced by evolution of gas bubbles (e.g., hydrogen and oxygen gas) from the filtrate.

The mesoporous gelatinous membrane allows sub-nanometer- to nanometer-sized particles through the gel, and a stable suspension of sub-nanometer- and nanometer-sized particles is formed at a pH in a range from about 7.3 to about 7.6, or from about 7.3 to about 11.5. These nanoparticles are sterically stabilized and may be thought of as a type of ionic salt in a nearly neutral aqueous phase solution. These ions are further stabilized by hydrogen bonding interactions. The metal peroxides are characterized by a high zeta potential. The siliceous nanogelatinous membrane formed as a side reaction in the filterand exhibits mesoporosity attributes (pore sizes between about 2 nm and about 50 nm or between about 2 nm and about 300 nm) that allow the nanoparticles of the metal peroxides to stabilize in the aqueous phase. As these stabilized nanoparticles are applied on substrates, hydrolysis and condensation reactions result in polymeric film formation. The gel, a nanocomposite of hybrid metal oxides, can be reconstituted and re-filtered to yield more of the vehicle system or for use in a variety of other applications, such as heterogeneous catalyst supports.

Figure 7:
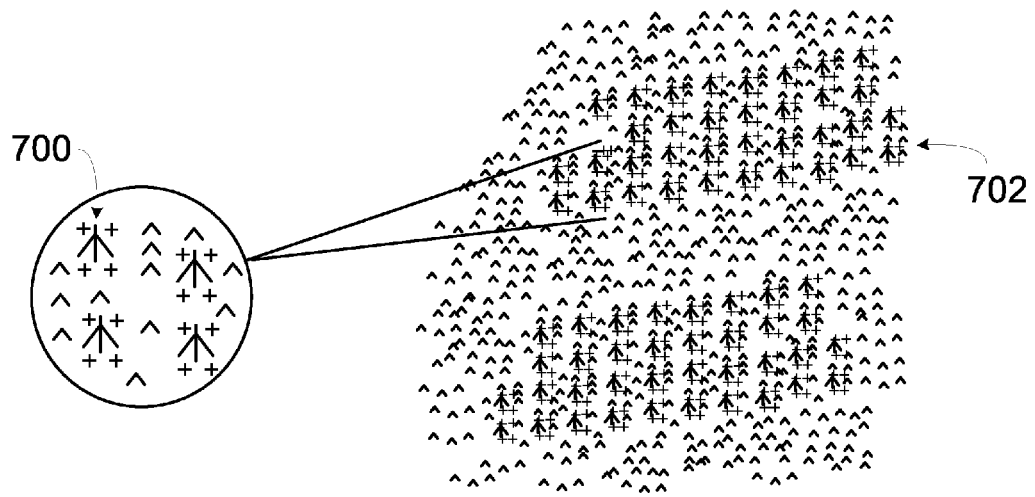
FIG. 7 depicts a model of sub-mesoporous metal peroxide interactions in solution.

Metal peroxide aggregates of nanoparticles in the clear metal peroxide solution (light transmission up to about 99.9%) appear to have a size distribution of aggregates ranging from about 10 nm or less to about 15 nm. Solids content of the solution ranges from about 0.1% to 1%. FIG. 7 (not to scale) depicts metal peroxide aggregates in solution, and the submesoporous interactions that are believed to be present. The ammonium-stabilized metal peroxides 700 are thought to be on the order of a few tenths of nanometers. These stabilized metal peroxides aggregate to form particles on the order of nanometers. The particles can aggregate in swaths 702, which may interact with other swaths of particles in solution. The swaths may be on the order of tens of nanometers long. When the solution is applied to a substrate, hydrolysis and condensation reactions result in a glassy, polymeric film bound to the surface of the substrate. These films have a thickness ranging from less than 1 nm to about 5 nm, or in some cases from about 1 nm to about 10 nm, indicating that the metal peroxide aggregates are loosely bound.

Metal salts added in steps 102 or 104 can be selected to enhance the process of forming a vehicle system, to enhance the resulting vehicle system, or both. For example, a $[SiO_x:ZrO_z:TiO_y]$ vehicle system can include about 80 wt % $SiO_x$, about 15 wt % $ZrO_z$, and about 5 wt % $TiO_y$. During step 102, $ZrCl_4$ reacts with concentrated HCl to form $ZrOCl_4$. This exothermic reaction increases the solubility of the $SiO_x$ in a $[SiO_x:ZrO_z:TiO_y]$ formulation relative to the solubility of $SiO_x$ in a $[SiO_x:TiO_y]$ formulation. Additionally, zirconium oxide in the polymeric film formed by a $[SiO_x:ZrO_z:TiO_y]$ vehicle system yields harder and more crack-resistant films.

$[SiO_x:ZrO_z:TiO_y]$ formulations are scratch resistant, transparent optical coatings that can be used in a variety of applications, such as catalyst supports, for which strength, adhesion, chemical and physical (e.g., thermal) durability are desired. As catalyst supports, the vehicle systems can be applied as a protective layer to organic substrates that would otherwise be damaged by photocatalytic $[TiO_y:SiO_x]$ compositions. In some embodiments, a photocatalytic coating is applied over a protective $[SiO_x:ZrO_z:TiO_y]$ coating. The $[SiO_x:ZrO_z:TiO_y]$ coating can also enhance adhesion strength of the photocatalytic coating. In some cases, a $[TiO_y:SiO_x]$ formulation is dispersed in a $[SiO_x:ZrO_z:TiO_y]$ formulation to achieve a desired distribution of metal oxides. In other cases, a protective $[SiO_x:ZrO_z:TiO_y]$ coating is applied over a photcatalytic $[TiO_y:SiO_x]$.

In some embodiments, a silaceous, nanogelatinous membrane with a composition of $[SiO_x:TiO_y]$ or $[SiO_x:ZrO_z:TiO_y]$ can be reconstituted to form a vehicle system with a solids content between about 0.1 and 0.25 wt % or between about 0.1 and 1 wt % of the total system. The vehicle system can be spray dried as a heterogeneous mesoporous silica pigment. The surface area of the dispersed nanoparticles is thought to be several hundred square meters per gram. The applied composition forms a thin, durable film of $[SiO_x:TiO_y]$ "glass." Utilizing a foam brush, a 25 micron wet film application of a composition with a solids content of about 0.25% after filtration yields a film build of about 63±6 nm. Similarly, utilizing a foam brush, a 25 micron wet film application of a composition with a solids content of about 0.1% after filtration yields a film build of about 25 nm.

[$SiO_x$:$ZrO_z$:$TiO_y$] vehicle systems can be used to form high κ dielectrics for use in semiconductor chips. In some embodiments, the weight ratios of [$SiO_x$:$ZrO_z$:$TiO_y$] are formulated to obtain a desired dielectric constant while achieving a film thickness targeted by the industry of about 4-6 nm, or even 1 nm or less for future advances. Percentage composition of the vehicle system can be tailored to achieve a high κ dielectric by adding a selected amount of silicon (dielectric constant of silicon dioxide=2 to 3.8), zirconium (dielectric constant of zirconium oxide=12.5), titanium (dielectric constant of titanium oxide=110), or any combination thereof. Thus, hybrid metal oxides described herein can easily provide an appropriately thin film with a dielectric constant adjustably higher than that of pure silicon dioxide. Moreover, these layers can be formed by simple (e.g. spray or brush) application of purely inorganic, aqueous film formers, and film formation can occur by drying at ambient temperature, eliminating the need for organometallics and volatile hazardous air pollutant solvents. Additionally, problems associated with carbon soot and electrically charged gate leakage are avoided.

The high water content (at least about 98 wt %) and the low solids content (less than about 2%, or between about 0.1% and 1%) of the vehicle systems described herein make them suitable for coating transparent substrates. With an effective percentage of anatase titanium oxide, [$SiO_x$:$TiO_y$] systems can be made increasingly photocatalytic. These systems can bond to transparent substrates such as glass and other substrates with hydroxide groups on the surface. Since the silicon oxide has a lower refractive index than the titanium oxide, a higher percentage of silicon oxide allows the light to remain in the film longer, resulting in improved photocatalytic efficacy of the coating. Thus, the [$SiO_x$:$TiO_y$] system can form a catalytic support matrix for a variety of catalytic reactions that benefit from high surface areas. In some embodiments, [$SiO_x$:$TiO_y$] formulations are applied over elastomeric, thermoset, or thermoplastic substrates and coated with a photocatalytic coating to protect organic polymeric substrates from photocatalytic degradation.

For a corrosion resistant film to be applied over a metal substrate, a [$SiO_x$:$TiO_y$] composition can include $SiO_x$:$TiO_y$ in a weight ratio of about 9:1 to about 9.99:0.01. In some cases, the vehicle system includes 100 wt % $SiO_x$. Hybrid [$SiO_x$:$ZrO_z$:$TiO_y$] formulations are also suitable for corrosion resistant coatings and can protect a substrate with hard, substantially impermeable, scratch-resistant film. Free radical degradation through exterior exposure is inhibited at the interface between the coating and the metal. These inorganic, polymeric coatings can protect a variety of metal substrates from anodic and cathodic electrochemical transport, thus inhibiting the electrochemical circuit required for corrosion, including galvanic corrosion, concentration cell corrosion, oxygen concentration cell corrosion, filiform corrosion, metal ion concentration cell corrosion, active/passive corrosion cells, intergranular corrosion, exfoliation corrosion, and metallic mercury corrosion.

The small particles in vehicle systems described herein yield thin, flexible glass coatings that can be used to seal exposed surfaces at the nanometer to mesoporous and macro film build levels, and thus cover substantially all exposed areas on a substrate. In some cases, organic monomers can be polymerized through hydrolysis and condensation reactions to form a polymer upon subsequent application of thin films. The incorporation of, for example, urethane or polyester functionality, together with silanes, can provide flexibility. More than one coating of the same or different composition and thickness can be applied to a surface to achieve desired results.

In some embodiments, a low percentage of photocatalytic anatase particles can be essentially locked in an inorganic glass film or matrix formed by a [$SiO_x$:$TiO_y$] vehicle system. These vehicle systems include, for example, at least about 90 wt % or at least about 99.9 wt % of $SiO_x$. In one embodiment, vehicle systems with about 98 wt % $SiO_x$ and about 2 wt % $TiO_y$ yield glass films with a thickness of about 1 nm to about 5 nm. In these hydrophobic embodiments, a low level of the anatase particles can function effectively as a UV absorber without degrading the coating.

In certain embodiments, a [$SiO_x$:$ZrO_z$:$TiO_y$] vehicle system includes addition of dipodal silanes such as, but not limited to, bis(trimethoxysilyl)methane or bis(triethoxysilyl) ethane silanes. The affinity of silane is greater for a vehicle system that is predominantly $SiO_x$ than for a vehicle system that is predominantly $TiO_y$. Thus, incorporating bis(trimethoxysilyl)methane or (triethoxysilyl ethane into a [$SiO_x$:$ZrO_z$:$TiO_y$] vehicle system yields a coating with hardness, adhesion, and scratch resistance superior to that of coatings formed from a [$TiO_y$:$SiO_x$] vehicle system with the same additive.

Example 1

$SiCl_4$ was incorporated to an aqueous mixture of titanium-based solution, including an acid and another metal chloride. A metal organic was incorporated into the vehicle system through the process depicted in FIG. 1, including neutralization of the acidic mixture with an ammonia-based solution, after which the solution had the appearance of a water-glass or a liquid silica. After filtration, reconstitution of the metal hydroxide, and addition of a peroxide-based solution, bis (triethoxysilyl)ethane was added to the amorphous metal peroxide solution. Bis(triethoxysilyl)ethane is a dipodal silane with the ability to form six bonds to a substrate. Once these bonds are formed, the resistance to hydrolysis is estimated to be about 100,000 times greater than that of conventional coupling agents with the ability to form only three bonds to a substrate, or about 75,000 times greater than a silane (such as tetraethoxysilane) able to form 4 bonds to a substrate.

The solution was boiled under pressure greater than atmospheric pressure. Continued boiling under pressure to increase the nanocrystalline metal oxide ratio resulted in an adhesive, transparent, photocatalytic film believed to provide corrosion inhibition when bonded to untreated steel substrates. The resulting PMHNC coating is believed to be a hybrid crystal of silicon, anatase, and zinc oxide, thought to include linear species such as Si—O—Ti—O—Ti—O—Ti—O—Zn—O.

Example 2

Non-porous ceramic tiles were coated with Composition A made as described herein with respect to the process in FIG. 1, with relative Si:Ti:Zr:Sn oxide percentages in the hybrid metal oxide of 0.63:90.68:3.31:4.48.

Two tiles were coated with Composition A and two tiles coated with a competing product were allowed to cure at ambient temperature for 24 hrs. 5 drops of deionized water: methylene blue solution (water:methylene blue ratio of 1000: 1) were deposited with a 3 mL pipette on one tile with a Composition A coating and one tile with the competing product coating. The drops were spread in a circle with a diameter of 2 cm. Tiles without methylene blue (one tile with a coating formed from Composition A and one tile with a coating formed from the competing product) were kept in the dark (dark control tiles).

The tiles with methylene blue drops were exposed to the south Florida sun during the day. Overnight, the tiles were placed 33 cm from UV lamps (F15T8BL 15W T8 18" BLACK LIGHT LITE F15W/BL emitting 365 nm manufactured by General Electric). Color readings of the methylene blue spots on each of the four tiles were taken at 8 hr intervals using an X-Rite 918 Tristimulus Reflection Colorimeter 0°/45°. Delta E of the methylene blue spots on the dark control tiles and the light-exposed tiles were recorded. As the stains on the two light-exposed treated tiles were remediated, the stained areas became lighter in total color and thus closer to the color of the dark control tiles.

Figure 8:
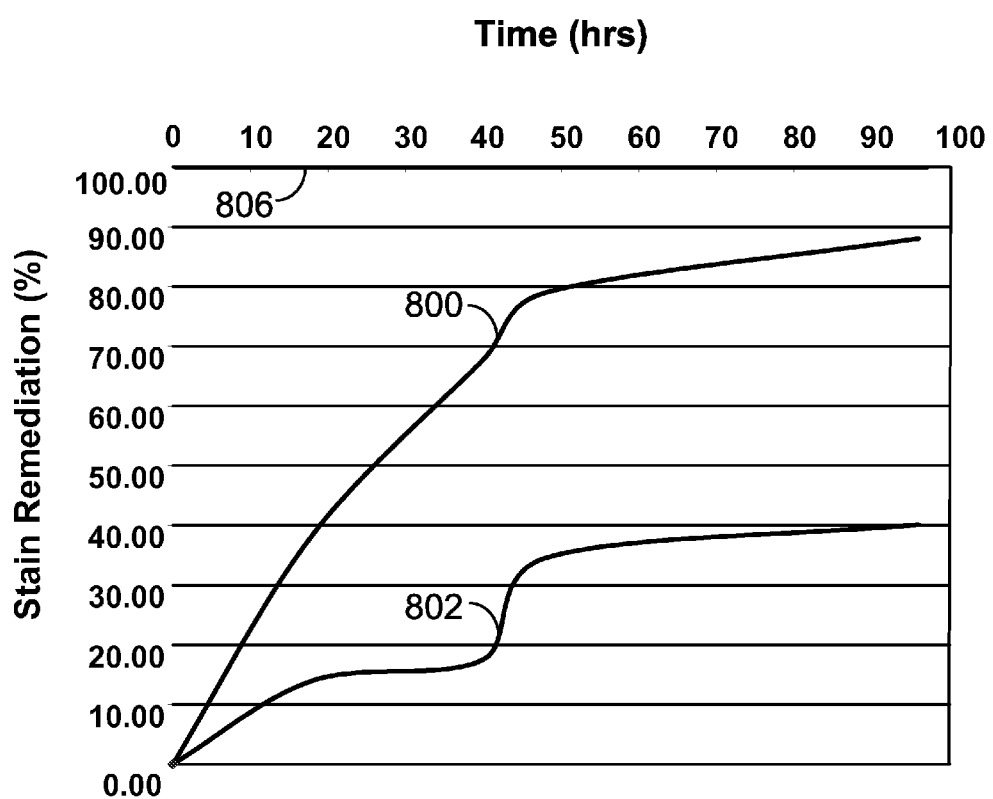
FIG. 8 is graph showing stain remediation provided by a hybrid metal oxide coating.

FIG. 8 shows % stain remediation of the dark control (no stains) and light-exposed tiles coated with Composition A and the competing product. The light-exposed tile coated with Composition A (plot 800) exhibited dramatic and surprising increasing photocatalytic efficacy as compared to the light-exposed tile coated with the competing product (plot 802). The dark controls are indistinguishable (plot 806). After approximately 100 hrs exposure, the tile coated with Composition A remediated the methylene blue with a 48% more effective photocatalytic efficacy than the tile coated with the competing product.

A number of embodiments of the invention have been described. Nevertheless, it will be understood that various modifications may be made without departing from the spirit and scope of the invention. Accordingly, other embodiments are within the scope of the following claims.

What is claimed is:

1. A method of preparing a composition, the method comprising:
   (a) forming an aqueous mixture comprising:
      (i) an organofunctional silane;
      (ii) a metal chloride; and
      (iii) an acid;
      to produce a siloxy compound;
   (b) boiling the aqueous mixture;
   (c) adding a base to the aqueous mixture to substantially neutralize the mixture and to form a hydroxide of the metal;
   (d) forming a colloidal suspension comprising the metal hydroxide and the siloxy compound;
   (e) adding a peroxide-based solution to form a suspension comprising a peroxide of the metal;
   (f) allowing the suspension to equilibrate at room temperature; and
   (g) boiling the suspension at a pressure greater than atmospheric pressure to form a hybrid film-forming composition comprising a condensation product of the siloxy compound and the metal peroxide, wherein the composition has a tighter particle size distribution and provides a more transparent coating than when the suspension is boiled at atmospheric pressure.

2. The method of claim 1, wherein the pH of the aqueous mixture in (a) and (b) is less than 1.

3. The method of claim 1, wherein the aqueous mixture formed in (a) further comprises an organometallic compound.

4. The method of claim 1, wherein the composition formed by boiling the suspension further comprises crystalline particles less than about 10 nm in diameter comprising a hybrid metal oxide.

5. The method of claim 1, wherein the film-forming composition comprises the condensation product of a siloxy compound and a transition metal peroxide.

6. The method of claim 1, wherein the organofunctional silane is selected from a group consisting of bis(triethoxysilyl)methane, 1,1,3,3-tetramethyl-1,3-diethoxydisiloxane, and octochlorotrisiloxane, tetraethoxysilane, or any combination thereof.

7. The method of claim 1, wherein the metal chloride comprises a chloride of silicon, titanium, zirconium, tin, vanadium, gallium, germanium, tellurium, hafnium, rhenium, iridium, platinum, or any combination of two or more chlorides of silicon, titanium, zirconium, tin, vanadium, gallium, germanium, tellurium, hafnium, rhenium, iridium, or platinum.

8. The method of claim 1, wherein the metal chloride is a metal tetrachloride.

9. The method of claim 1, further comprising applying the hybrid film-forming composition to a substrate and drying the composition to form a coating on the substrate.

10. The method of claim 9, wherein the coating is hydrophilic.

11. The method of claim 10, wherein a contact angle of water on the coating is less than about 10°.

12. The method of claim 1, wherein the organofunctional silane is chlorinated.

13. The method of claim 1, wherein the mixture formed in (a) further comprises one or more additional metal chlorides.

14. The method of claim 1, further comprising adding an additional reactive compound to the colloidal suspension formed in (d).

15. The method of claim 1, further comprising adding an unreactive compound during the forming of the colloidal suspension in (d).

16. The method of claim 1, further comprising adding an organometallic compound during the forming of the colloidal suspension in (d).

17. The method of claim 1, further comprising adding an organometallic compound during the boiling of the suspension in (g).

18. A method for preparing an article, the method comprising:
   (a) providing a composition comprising:
      (i) an aqueous carrier; and
      (ii) a condensation product of a siloxy compound and a metal peroxide, wherein the condensation product is formed by boiling the siloxy compound and the metal peroxide at a pressure greater than atmospheric pressure, wherein the composition has a tighter particle size distribution and provides a more transparent coating than when the suspension is boiled at atmospheric pressure;
   (b) applying the composition to a surface of a substrate; and
   (c) removing the aqueous carrier to form an article comprising a siloxy-peroxy hybrid metal coating on the surface of the substrate, wherein the coating is hydrophilic.

19. The method of claim 18, wherein the composition further comprises crystalline particles with a diameter less than about 10 nm comprising a hybrid metal oxide.

20. The method of claim 18, wherein the composition further comprises crystalline particles with a diameter less than about 10 nm comprising a metal oxide.

21. The method of claim 18, wherein a thickness of the coating is between about 2 nm and about 10 nm.

22. The method of claim 18 wherein the coating is covalently bonded to the surface of the substrate.

23. The method of claim 18, wherein a thickness of the coating is between about 10 nm and about 800 nm.

24. The method of claim 18, wherein a thickness of the coating is between about 10 nm and about 1 μm.

25. The method of claim 18, wherein the coating is ionically bonded to the surface of the substrate.

26. A method for preparing an article, the method comprising:
   (a) providing a composition comprising:
      (i) an aqueous carrier; and
      (ii) the condensation product of a siloxy compound and a metal peroxide;
   (b) applying the composition to a surface of a substrate; and
   (c) removing the aqueous carrier to form an article comprising a siloxy-peroxy hybrid metal coating on the surface of the substrate, wherein the coating is hydrophilic and a contact angle of water on the coating is less than about 10°.

27. A method for preparing an article, the method comprising:
   (a) providing a composition comprising:
      (i) an aqueous carrier; and
      (ii) the condensation product of a siloxy compound and a metal peroxide;
   (b) applying the composition to a surface of a substrate; and
   (c) removing the aqueous carrier to form an article comprising a siloxy-peroxy hybrid metal coating on the surface of the substrate, wherein the coating is hydrophilic and the coating forms a self-assembled monolayer on the surface of the substrate.

28. A method for preparing an article, the method comprising:
   (a) providing a composition comprising:
      (i) an aqueous carrier; and
      (ii) a condensation product of a siloxy compound and a metal peroxide, wherein the condensation product is formed by boiling the siloxy compound and the metal peroxide at a pressure greater than atmospheric pressure;
   (b) applying the composition to a surface of a substrate; and
   (c) removing the aqueous carrier to form an article comprising a siloxy-peroxy hybrid metal coating on the surface of the substrate, wherein the coating is hydrophobic.

29. A method for preparing an article, the method comprising:
   (a) providing a composition comprising:
      (i) an aqueous carrier; and
      (ii) the condensation product of a siloxy compound and a metal peroxide;
   (b) applying the composition to a surface of a substrate; and
   (c) removing the aqueous carrier to form an article comprising a siloxy-peroxy hybrid metal coating on the surface of the substrate, wherein the coating is hydrophobic and the coating forms a self-assembled monolayer on the surface of the substrate.

30. A method of preparing a composition comprising:
   (a) forming an aqueous mixture comprising:
      (i) an organometallic compounds;
      (ii) a metal chloride; and
      (iii) an acid;
   to produce a siloxy compound;
   (b) boiling the aqueous mixture;
   (c) adding a base to the aqueous mixture to substantially neutralize the mixture and to form a hydroxide of the metal;
   (d) forming a colloidal suspension comprising the metal hydroxide and the siloxy compound;
   (e) adding a peroxide-based solution to form a suspension comprising a peroxide of the metal;
   (f) allowing the suspension to equilibrate at room temperature; and
   (g) boiling the suspension at a pressure greater than atmospheric pressure to form a hybrid film-forming composition comprising a condensation product of the siloxy compound and the metal peroxide, wherein the composition has a tighter particle size distribution and provides a more transparent coating than when the suspension is boiled at atmospheric pressure.

\* \* \* \* \*